United States Patent
Sakakibara et al.

(10) Patent No.: US 6,549,265 B1
(45) Date of Patent: Apr. 15, 2003

(54) IMAGE FORMATION APPARATUS AND METHOD OF STABILIZING THE EMISSION LEVEL OF SEMICONDUCTOR LASER SOURCE USED THEREIN

(75) Inventors: Jun Sakakibara, Tokyo (JP); Koji Tanimoto, Kawasaki (JP); Kenichi Komiya, Kawasaki (JP); Toshimitsu Ichiyanagi, Zushi (JP); Naoaki Ide, Shizuoka (JP); Koji Kawai, Fujisawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 106 days.

(21) Appl. No.: 09/662,180

(22) Filed: Sep. 14, 2000

(30) Foreign Application Priority Data

Sep. 20, 1999 (JP) .............................................. 11-265356

(51) Int. Cl.[7] ........................ G03B 27/72; G03B 27/54; G03B 27/52; B41J 2/435; B41J 2/47

(52) U.S. Cl. .............................. 355/35; 355/37; 355/40; 355/41; 355/47; 347/224; 347/225; 347/229; 347/234; 347/235; 347/236

(58) Field of Search .............................. 355/35, 37, 40, 355/41, 47; 347/224, 225, 229, 231, 233, 234, 235, 236

(56) References Cited

U.S. PATENT DOCUMENTS 5,097,293 A * 3/1992 Seto et al.
5,724,087 A * 3/1998 Sugano et al.

* cited by examiner

Primary Examiner—Russell Adams
Assistant Examiner—Khaled Brown
(74) Attorney, Agent, or Firm—Foley & Lardner

(57) ABSTRACT

The emission level of a laser source at the non-imaging time when image data "0" is input and the emission level at the imaging time when image data "1" is input are controlled so that each of them becomes a desired level. The light output intensity is stabilized at all times regardless of variations in ambient temperature. As a result, images uniform in density can be obtained.

12 Claims, 17 Drawing Sheets

IMAGE FORMATION APPARATUS AND METHOD OF STABILIZING THE EMISSION LEVEL OF SEMICONDUCTOR LASER SOURCE USED THEREIN

CROSS-REFERENCE TO RELATED APPLICATIONS

This application is based upon and claims the benefit of priority from the prior Japanese Patent Application No. 11-265356, filed Sep. 20, 1999, the entire contents of which are incorporated herein by reference.

BACKGROUND OF THE INVENTION

The present invention relates to, for example, an image formation apparatus, such as a digital copying machine, which scans a laser beam emitted from a semiconductor laser source across a photosensitive drum to form an electrostatic latent image on the drum and then applies a developer to the latent image to form an image and more specifically to a method of stabilizing the emission level of the semiconductor laser source used in the image formation apparatus.

In general, image formation apparatuses, such as digital copying machines, which use a semiconductor laser source as a light source are arranged to detect the emission level of the laser source at image formation time by means of a photodiode built in or outside the laser source and stabilization-control the emission level through the use of the output current of the photodiode (such control is generally called APC: Auto Power Control).

The APC is generally performed on the emission level of the semiconductor laser source at the time of image formation. In this system, no current is applied to the semiconductor laser source when no image is formed. In another APC system, the power is controlled by supplying the semiconductor laser with a constant amount of current that is below a threshold current which is a point of change at which the semiconductor laser makes the transition from the LED emission (i.e., spontaneous emission) region to the laser oscillation region.

It is well known that, when a current corresponding to the emission level at image formation time, for example, a current in the form of a rectangular pulse, is rapidly applied to the semiconductor laser source which has not been supplied with any current, an overshoot, called relaxation oscillation, occurs in the rising portion of a light output of the semiconductor laser.

With semiconductor lasers that emit light of wavelengths in the range of 630 to 690 nm using AlGaInP, called red semiconductor lasers, it is known that not only the relaxation oscillation is involved, but the relationship of thermal conductivity among the materials that construct the laser requires several microseconds until the light output reaches a desired intensity level even if a rectangular pulse of current is applied. In image formation under such conditions, disadvantages arise in that the tip of a fine line formed along the direction in which a laser beam is swept becomes too fine, and the tip portions of a solid image become blurred.

There is also likely to arise a problem that noise is radiated to outside through an interconnection pattern or wire harness on a control board on which the drive circuit of the semiconductor laser is mounted because a drive current in excess of 50 mA is controlled at a high frequency corresponding to a picture signal.

Next, a description is given of a case where the semiconductor laser has been supplied in advance with a constant current and a current corresponding to a signal indicating whether to form an image or not is superimposed on that constant current.

The semiconductor laser causes spontaneous emission until a certain fixed current flows, but not laser action. When the fixed current is exceeded, the semiconductor laser performs laser action. The constant current, referred to as a threshold current, varies from device to device or from manufacturing lot to lot. The threshold current increases with increasing environmental temperature.

When a current corresponding to a signal indicating whether to form an image or not is superimposed on the constant current, therefore, there arises a problem that, depending on the environmental temperature, the waveform of light output of the semiconductor laser may vary. Specifically, in the event that, at a low temperature, the threshold current lowers below the constant current, the semiconductor laser will start laser action with the constant current. That is, laser action is performed even when no image is to be formed, which causes a problem in which an unwanted tonor image is formed.

Conversely, when the threshold current increases at a high temperature to become much higher than the constant current, there arise problems that the effect of adding the constant current is reduced, an overshoot occurs in the light output waveform, and several microseconds are taken for the light output to reach a desired intensity level.

At to noise, it is inevitable that a phenomenon will occur by which radiation noise increases with increasing temperature.

BRIEF SUMMARY OF THE INVENTION

It is an object of the present invention to provide an image formation apparatus and a method of stabilizing the emission level of a semiconductor laser source used therein which permit stable emission intensities of the laser source to be always obtained both at the time no image is formed and at the time an image is to be formed regardless of variations in ambient temperature and consequently an image uniform in density to be formed.

It is another object of the present invention to provide an image formation apparatus and a method of stabilizing the emission level of a semiconductor laser source used therein which, even with variations in operating temperature (ambient temperature), prevents radiation noise and the response time of the semiconductor laser source from varying and thus permits stable light output waveforms with short rise and fall times to be obtained.

In order to achieve the above objects, according to one aspect of the present invention, there is provided an image formation apparatus for forming an image on an image carrier by scanning an imaging region on the image carrier and a non-imaging region with a laser beam emitted from a semiconductor laser source, comprising: a detector for detecting the emission level of the laser source; a first emission level control unit which controls a drive current supplied to the laser source on the basis of the result of detection by the detector so that the laser source emits light at a predetermined spontaneous emission level at the time no image is formed by the laser source; and a second emission level control unit which controls the drive current applied to the laser source on the basis of detection by the detector so that the laser source emits light at a first laser emission level at the time an image is formed by the laser source.

The first and second emission level control units are adapted to control the drive current when the laser beam is scanning the non-imaging region. The first emission level control unit includes a first drive unit which, during a first time interval, drives the laser source with a current which corresponds to the sum of a first drive current corresponding to the spontaneous emission level and a second drive current having a fixed value to thereby allow the laser source to emit light at a second laser emission level, and the second emission level control unit includes a second drive unit which, during a second time interval, drives the laser source with a third drive current corresponding to the first laser emission level to thereby allow the laser source to emit light at the first laser emission level.

As a result, the emission intensities of the laser source at both the imaging and non-imaging times can be controlled to desired values at all times regardless of variations in ambient temperature. In addition, even if the operating temperature (ambient temperature) varies, the response time required for the semiconductor laser source to rise/fall remains unchanged; thus, light output waveforms with good rise and decay times can be obtained at all times.

According to another aspect of the present invention, there is provided an image formation apparatus for forming an image on an image carrier by scanning a laser beam emitted from a semiconductor laser source across the image carrier through an optical system, comprising: a detector for detecting the emission level of the laser source; a first adjust unit which adjusts variations in the detecting efficiency of the detector; a first emission level control unit which controls a drive current supplied to the laser source on the basis of the result of detection by the detector so that the laser source emits light at a predetermined spontaneous emission level at the time no image is formed by the laser source; a second emission level control unit which controls the drive current applied to the laser source on the basis of detection by the detector so that the laser source emits light at a first laser emission level at the time an image is formed by the laser source; and a second adjust unit which compensates for variations in attenuation characteristics of the optical system.

Variations in the detection efficiency of the detector for detecting the emitting conditions of the semiconductor laser and variations in the optical characteristics of the optical system can be compensated for. Thus, the emission level control is performed more precisely.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, the embodiments of the present invention will be described with reference to the accompanying drawings.

Figure 1:
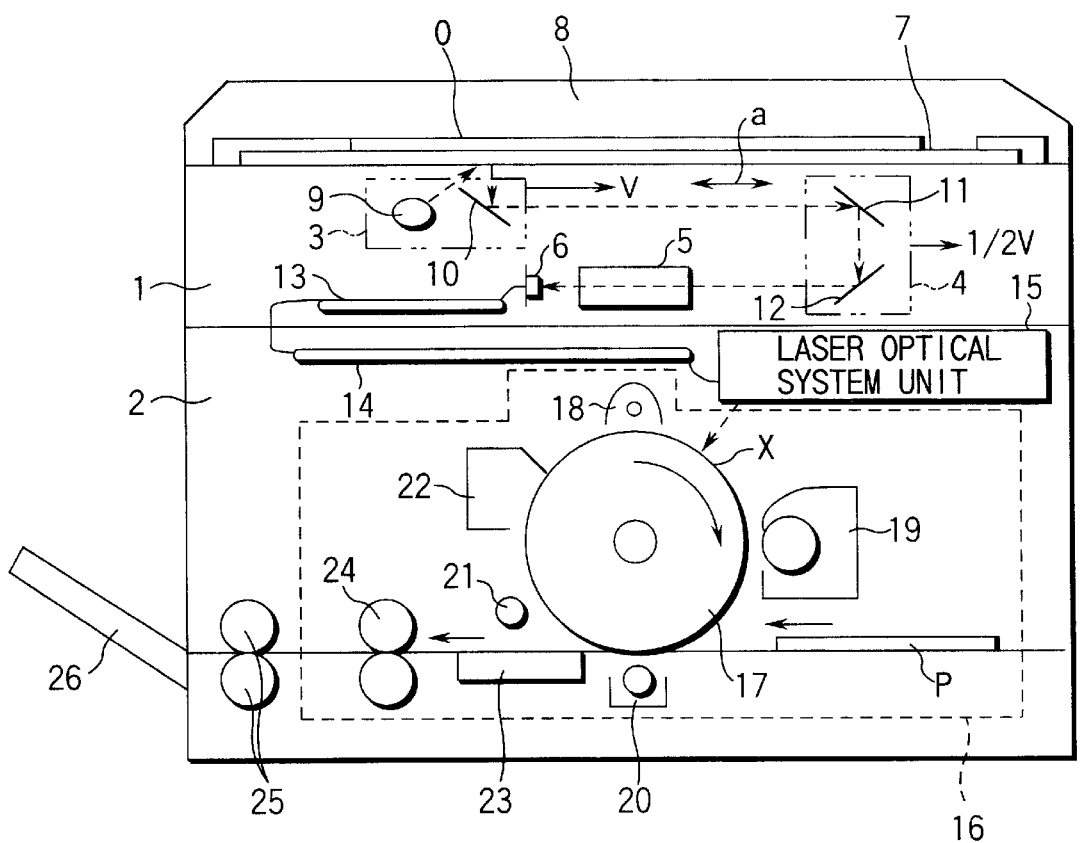
FIG. 1 is a schematic side view of a digital copying apparatus to which the present invention is applied.

FIG. 1 schematically illustrates the structure of a digital copying apparatus as an image formation apparatus of the present invention. This digital copying apparatus includes a scanner 1 as image reading mans and a printer 2 as image formation mans.

The scanner 1 is composed of first and second carriages 3 and 4 that reciprocate in directions indicated at a, a condenser lens 5, a photoelectric transducer 6, etc.

In the scanner 1, an original document O is placed on a glass plate 7 with its image side down and pressed against the glass plate by closing a movable cover 8.

The document O is illuminated by a light source 9. The reflected light from the document O is focused by mirrors 10, 11 and 12 and the condenser lens 5 onto the light receiving surface of the photoelectric transducer 6. The first carriage 3 on which the light source 9 and the mirror 10 are mounted and the second carriage 4 on which the mirrors 11 and 12 are mounted are moved from right to left by a carriage driving motor not shown, so that the document O is scanned by the light from the light source 9.

The speed at which the first carriage 3 moves is set to twice that of the second carriage 4 so that the optical path length between the document O and the photoelectric transducer 6 is kept constant at all times.

In this manner, the image of the document O placed on the glass plate 7 is read on a line-by-line basis and converted into an analog electrical signal. The analog electrical signal is then converted by a signal processing circuit mounted on a control board 13 into a digital signal representing the light and shade of the image. The digital signal is subjected to digital signal processing, such as shading correction for correcting low-frequency distortion due to the condenser lens 5 and high-frequency distortion resulting from variations in sensitivity of the photoelectric transducer 6. The digital signal is further subjected to image processing, such as dithering, smoothing, etc., on an image processing board 14 on which image processing circuits are mounted. After that, the digital signal is converted into a drive signal for a semiconductor laser and output to a laser optical system unit 15.

The printer 2 comprises the laser optical system unit 15 and an electrophotographic image formation unit 16 that permits an image to be formed on paper P as a medium on which an image is formed. The laser optical system unit 15 will be described in detail with reference to FIG. 2.

A laser control circuit 150 (mounted on a laser control board not shown) for controlling a semiconductor laser source 151 supplies a laser diode 151a contained in the laser source with a current. A beam of monitoring light (back beam) emitted from the laser diode 151a is received by a photodiode 151b placed in the neighborhood of the laser diode. The photodiode 151b converts the received light signal into an electrical signal corresponding to the intensity of emitted light, which is in turn applied to the laser circuit 150. Thereby, the laser control circuit 150 is allowed to electrically detect the emitting conditions of the laser diode 151a.

In this embodiment, the laser diode 151a and the photodiode 151b are physically integrated with each other and collectively defined as a semiconductor laser source. It should be noted however that each of the laser diode and the photodiode may be physically incorporated into a separate device provided that their functions remain unchanged. In that case, the laser diode will be defined as a semiconductor laser source, while the photodiode will be defined as a detector for detecting the emitting conditions of the laser source.

The emission intensity at the time an image is formed and the emission intensity at the time no image is formed are controlled by an auto power control circuit to be described later.

A beam of laser light (front beam) from the laser diode 151a passes through the condenser lens 152 and is then reflected by a polygon mirror 153, which is rotated at a constant speed by a polygon motor driven by a polygon motor driver not shown. The reflected light from the polygon mirror 153 passes through an f-θ lens 154 and is then reflected by a first folding mirror 155 onto an exposure position X on a photosensitive drum 17 as an image carrier. Thereby, an electrostatic latent image is formed on the drum 17.

A portion of light passed through the f-θ lens 154 is reflected by a second folding mirror 156 onto a sync signal sensor 157 which produces a sync signal HSYNC for establishing synchronization on a line-by-line basis.

Referring back to FIG. 1, the image formation unit 16 will be described in detail.

Around the photosensitive drum 17 are mounted a charger 18 for charging the drum surface, a developing unit 19, a transfer charger 20, a peeling charger 21, and a cleaner 22 in this sequence. The photosensitive drum 17 is rotated at a given speed by the drive motor not shown and charged by the charger 18 provided opposite the drum surface. A laser beam from the laser diode 151a is spot focused onto the exposure position X on the charged drum 17.

Upon exposure to light, the potential in the exposure position X on the drum is lowered, forming an electrostatic latent image. The latent image is developed by tonor (developer) supplied from the developing unit 19, so that a tonor-based image is formed on the drum. The tonor image is transferred by the transfer charger 20 to a sheet of paper P fed by the paper feed system to a point of transfer in a timely manner.

The paper feed system feeds sheets of paper P set in a feed cassette (not shown) provided at the bottom of the apparatus one at a time through feed rollers and separating rollers not shown. After that, paper P is sent to registration rollers not shown and then fed timely to the transfer position. A paper carry mechanism 23, a fixing unit 24 and eject rollers 25 for ejecting image-formed paper P are arranged downstream of the transfer charger 20. Thereby, the tonor image-formed paper P has the tonor image fixed by the fixing unit 24 and is then ejected through the eject rollers to an external exit tray 26.

After the termination of image transfer to the paper P, the photosensitive drum 17 has the residual tone on its surface removed by the cleaner 22, then returns to the initial condition and stands by for the next image formation.

By repeating the above processes, the image formation is performed in succession.

Next, the basic characteristics of the laser diode 151a placed in the semiconductor laser source 151 will be described with reference to FIGS. 3A and 3B.

Figure 3:
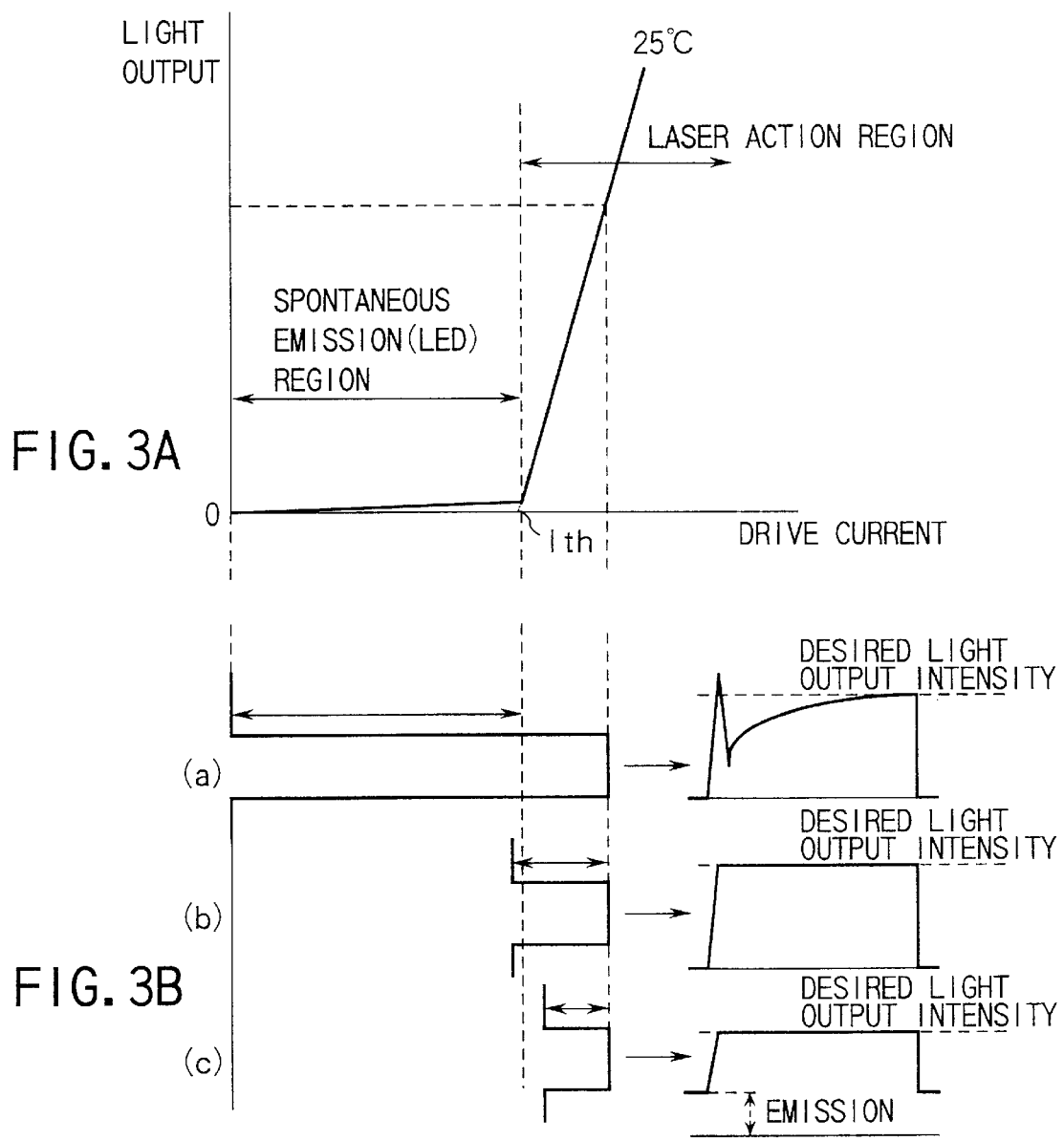
FIGS. 3A and 3B are diagrams for use in explanation of the basic characteristics of a semiconductor laser.

In FIG. 3A, the drive current supplied to the laser diode 151a is shown on the horizontal axis and the corresponding intensity of light output is shown on the vertical axis. As is evident from the drawing, in the region where the drive current is less than the threshold current (Ith) at which the semiconductor laser initiates emission, the semiconductor laser performs spontaneous emission (LED emission) and is placed in unstable state where the light intensity little increases even with the drive current increased.

With the drive current set larger than the threshold current, on the other hand, the semiconductor laser performs laser action, allowing the light intensity proportional to the drive current to be obtained. A proportion of the amount of light output to the amount of drive current in the laser action region is referred to as the slope efficiency ($\eta$), which is a measure of the emission efficiency.

FIG. 3B shows the drive current waveforms and the light output waveforms of the semiconductor laser source.

The waveform (a) is a drive current waveform when a current corresponding to the laser action region is applied to the semiconductor laser source in the state where no current or a current much smaller than the threshold current is being applied to the laser source. In this case, an overshoot, called the relaxation oscillation, appears in the rising portion of the light output waveform of the semiconductor laser source as shown in a right figure. In the communication-related field, communications are sometimes made using this overshoot.

The waveform (b) is a drive current waveform when a current corresponding to laser action is applied in the state where a current which is sufficiently close to but less than the threshold current is being applied to the semiconductor laser source. In this case, the low level of the light output corresponds to the spontaneous emission level described in connection with FIG. 3A, emitting very dim light. The light output waveform remains unchanged from the drive current waveform as shown in a right figure.

The waveform (c) is a drive current waveform when the initial drive current is set to a drive current in excess of the threshold current and a predetermined current is added to the initial drive current. In this case, the low and high levels of the resultant drive current are present in the laser action region, and the light output waveform is the most faithful to the drive current waveform as shown in a right figure. In optical disk-related equipment, the semiconductor laser is controlled under this condition.

In the digital copying apparatus, since a small pulse cannot be produced with the current waveform (a), a fine line in the sub-scanning direction cannot be reproduced. In addition, a problem arises in that an unwanted image will be created by the overshoot. In the case of the drive current (c), the laser diode 151a will emit light even at the time no image is to be formed and the problem arises, in which tonor adheres to a white portion of an output image. In the case of the drive current waveform (b), there is a small light output at the low level. However, the amount of light directed onto the photosensitive drum 17 is reduced because of attenuation due to transmission through the condenser lens 152, reflection by the polygon mirror 153, transmission through the f-θ lens 154, and reflection by the first folding mirror 155, and the above problem does not easily occur.

Figure 4:
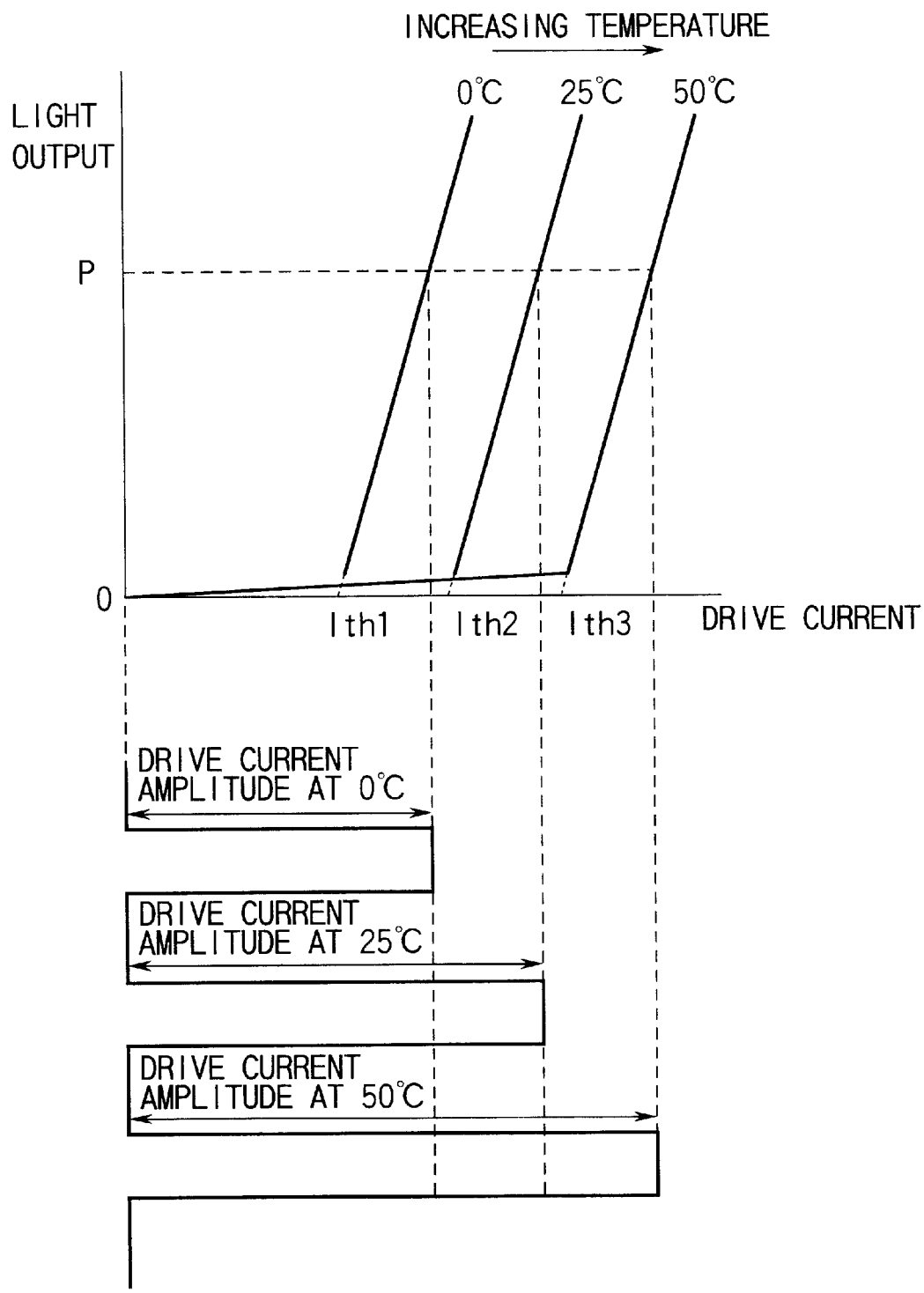
FIG. 4 shows light output versus drive current characteristics of the semiconductor laser for different temperatures.

FIG. 4 shows light output intensity versus drive current of the semiconductor laser source for different temperatures. In general, the semiconductor laser source has a property that, when the ambient temperature, i.e., the temperature of the case for housing the laser diode, is lowered, the threshold current at which the light emission is initiated is lowered and, when the case temperature is elevated, the threshold current is increased. Let the drive currents at ambient temperatures of 0° C., 25° C., and 50° C. be Ith1, Ith2, and Ith3, respectively. Then, a relationship such that Ith1 <Ith2<Ith3 holds as shown in FIG. 4. Therefore, in order to allow the semiconductor laser source to produce light outputs of the same intensity at different temperatures, it is required to change the magnitude of the drive current according to the ambient temperature.

Figure 5:
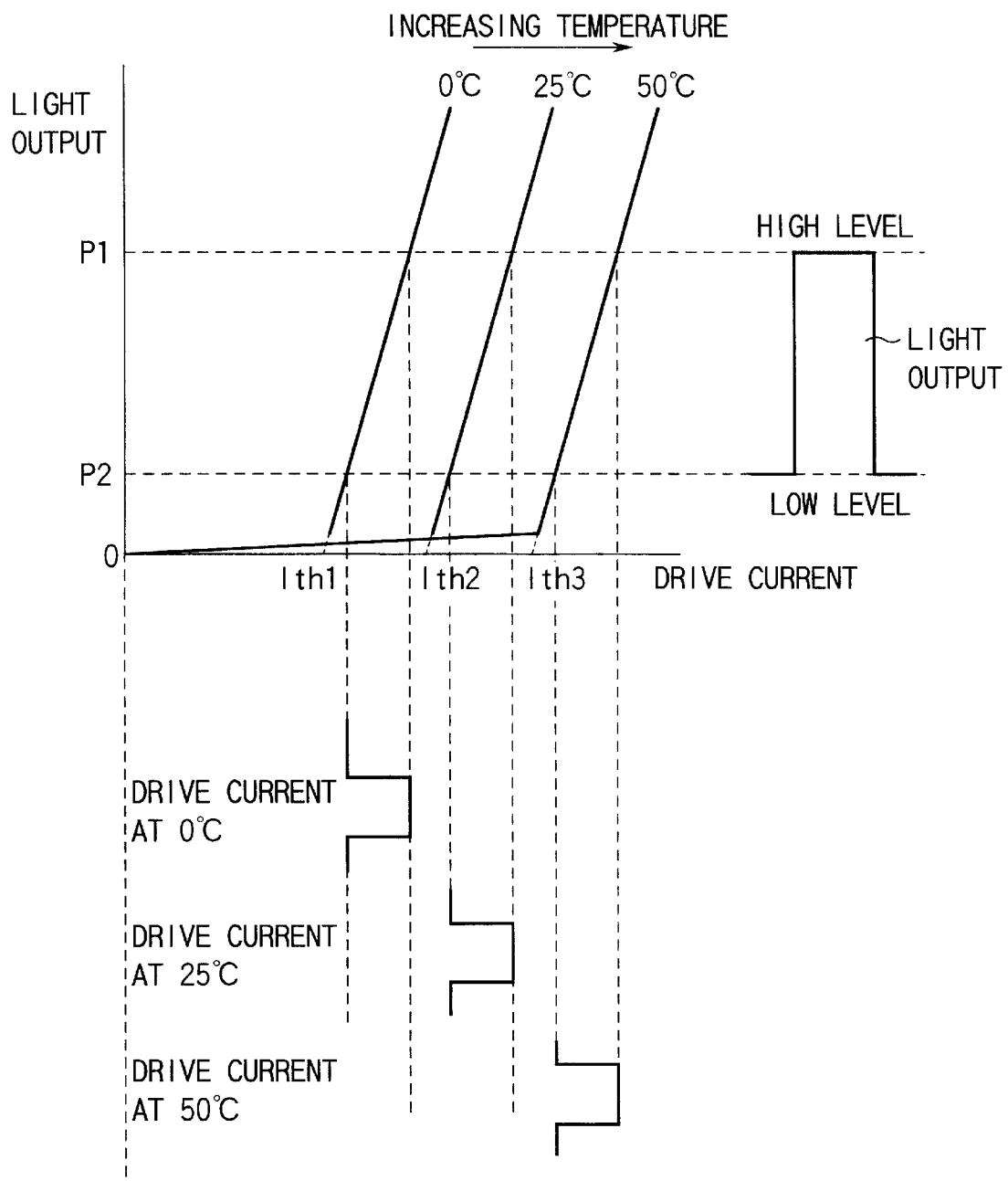
FIG. 5 is a diagram for use in explanation of the principles of the invention.

To make the light output (emission level) remain unchanged with variations in temperature is the object of the present invention. FIG. 5 illustrates the principles of the present invention. From FIG. 5, it can be seen that stable light outputs can be ensured without being affected by variations in temperature by performing APC processing on both the low level of the light output which is an emission level at the time no image is formed and the high level which is an emission level at the time an image is formed.

In the digital copying apparatus, depending on the process conditions in development, the semiconductor laser source is generally caused to emit light only at the time an image is to be formed but not at the time no image is formed.

It is therefore desired that the drive current of the laser diode 151a at the time no image is formed be set lower than and sufficiently close to the threshold current at any ambient temperature. In addition, it is required to control the drive current of the laser diode 151a at the time an image is formed so that the diode will emit a beam of light of proper intensity at any ambient temperature. The present invention has been made so as to meet such requirements and will be described specifically with reference to FIG. 6.

Here, the process of controlling the drive current of the laser diode 151a at the time no image is formed is taken as first APC processing, while the process of controlling the drive current of that laser diode at the time an image is formed is taken as second APC processing.

At the time of the first and second APC processing, the laser diode 151a in the semiconductor laser source 151 must be driven with a current above the threshold current. The back beam at that time is received by the photodiode 151b. It is required to keep the monitoring output current of the photodiode 151b constant. For digital copying apparatus, however, it is not desired to irradiate the photosensitive drum 17 with light when no image is formed. Therefore, the first and the second APC processing are performed when a laser beam scans through an area other than the photosensitive drum.

Figure 6:
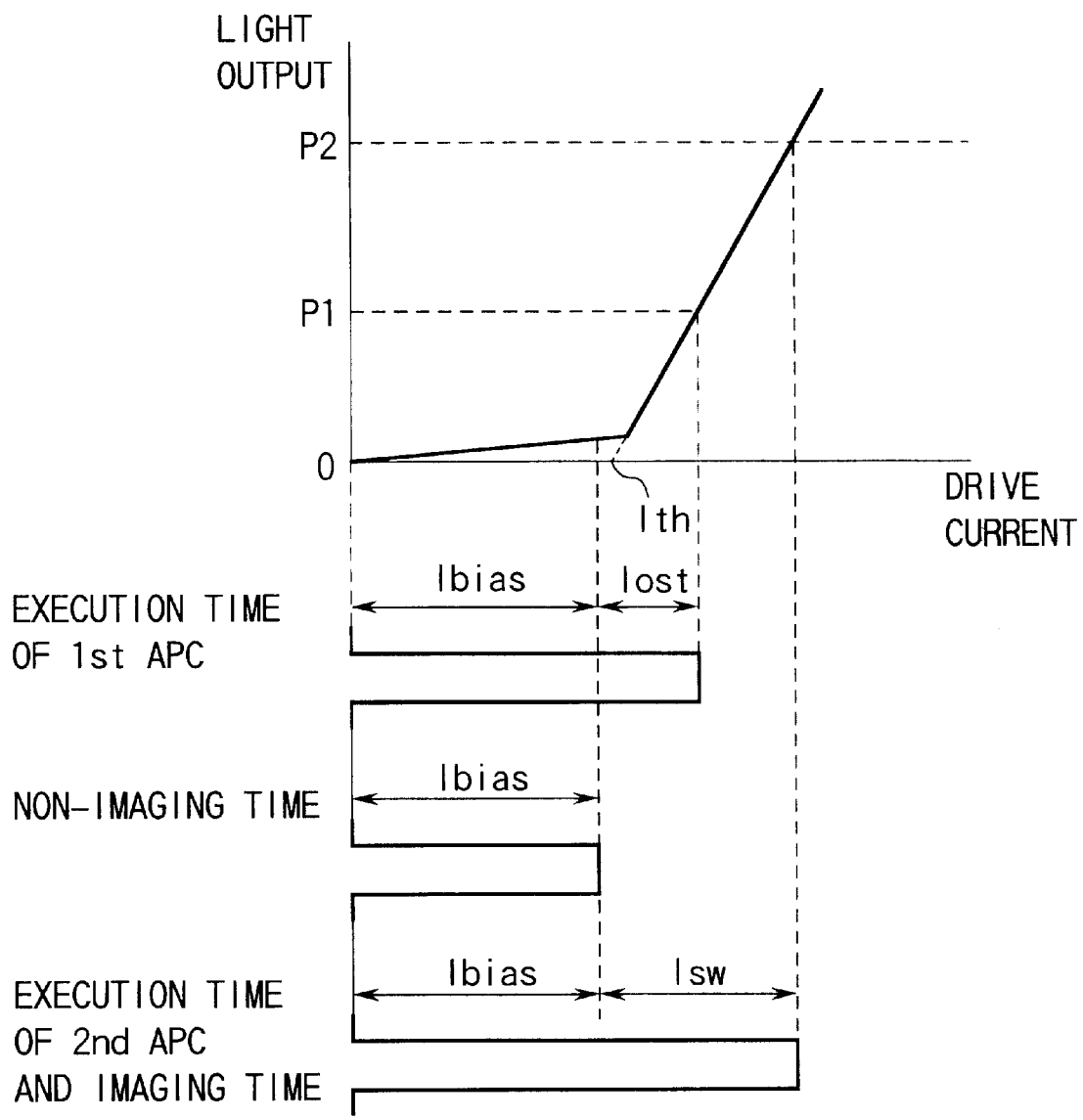
FIG. 6 is a diagram for use in explanation of the principles of the invention.

As shown in FIG. 6, in the first APC processing, the laser diode 151a is supplied with a current (Ibias+Iost) to operate in the laser action region. The APC processing is performed on an emission level P1 at that time. At the termination of the APC processing, a constant current Iost is subtracted so that the laser diode is supplied with a low-level current Ibias. By adopting such an approach, the threshold current corresponding to the temperature at that time can be known to supply the laser diode with the proper low-level current Ibias.

Even when supplied with a current less than the threshold current Ith, however, the laser diode 151a will make light emission called spontaneous emission. The amount of light based on spontaneous emission is very small in comparison with that when the laser diode is supplied with a current in excess of the threshold current Ith to cause laser action.

Next, the second APC processing is performed on the emission level P2 at the time an image is formed. In this case, a drive current Iwrite for the laser diode is determined by the APC processing at the time of the emission level P2 in a state where the laser diode is supplied with the current Ibias below the threshold current Ith. In this case, the drive current for the emission level P2 is the sum of the current Ibias and a modulation current ISw. Thereby, the laser diode 151a is allowed to emit light at the level P2 most suitable for image formation at any ambient temperature.

Figure 7:
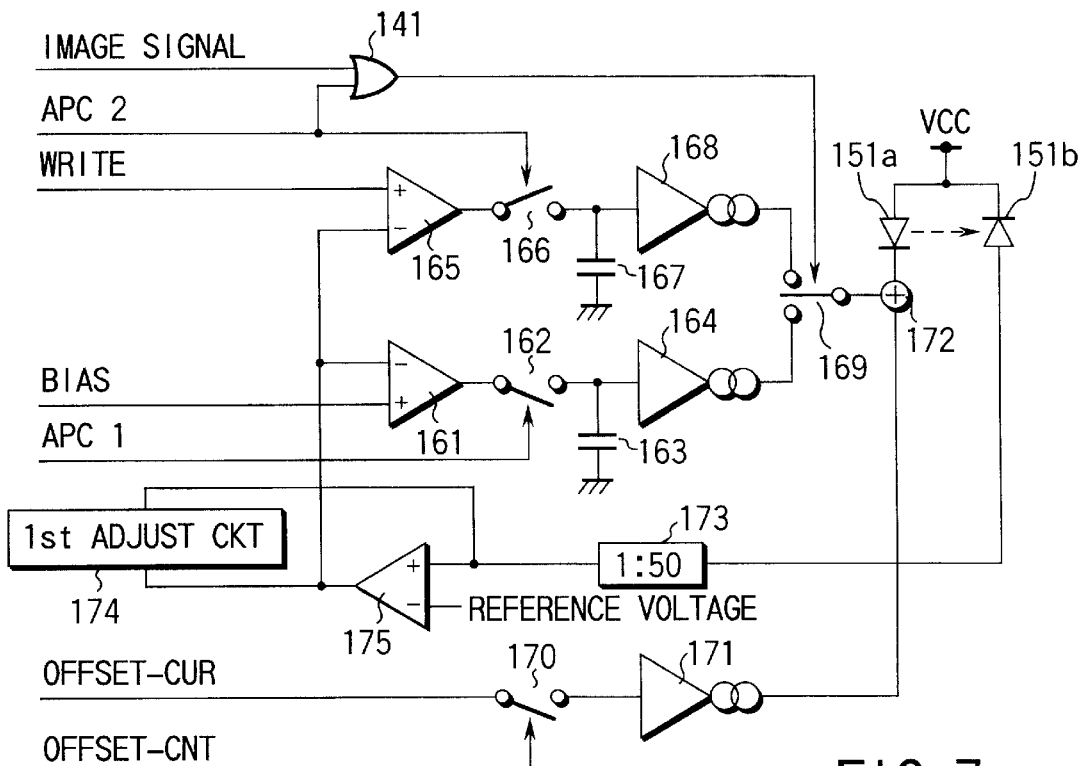
FIG. 7 is a schematic illustration of the laser control circuit according to a first embodiment of the present invention.

A specific arrangement according to a first embodiment of the present invention to achieve the above control will be described. FIG. 7 shows the arrangement of the laser control circuit 150 (see FIG. 2) according to the first embodiment. This circuit comprises a comparator 161 for the first APC processing, a switch 162 which is closed (rendered conductive) only during the interval of the first APC processing, a capacitor 162 which is charged or discharged during the interval of the first APC processing, a current amplifier 164 having its input connected to the capacitor 163, a comparator 165 for the second APC processing, a switch 166 which is closed (rendered conductive) only during the interval of the second APC processing, a capacitor 167 which is charged or discharged during the interval of the second APC processing, a current amplifier 168 having its input connected to the capacitor 167, a change-over switch 169 which selects from the outputs of the current amplifiers 164 and 168, an OR circuit 141 which provides a switching signal to the switch 169, a switch 170 which controls a current at the first APC processing, a current amplifier 171 having its input connected to the switch 170, a current adder 172 which adds the output of the switch 169 and the output of the current amplifier 171 and supplies the sum to the laser diode 151a, a current amplifier 173 which processes the output current of the photodiode 151a, and a gain amplifier 175 which is supplied with the output of the current amplifier 173 and has its amplification factor adjusted by a first adjust circuit 174 as first adjust unit. An output signal of the gain amplifier 175 is applied to each of the comparators 161 and 165 as a comparison signal.

Next, the operation of the circuit of FIG. 7 will be described with reference to FIGS. 8 and 9.

Figure 8:
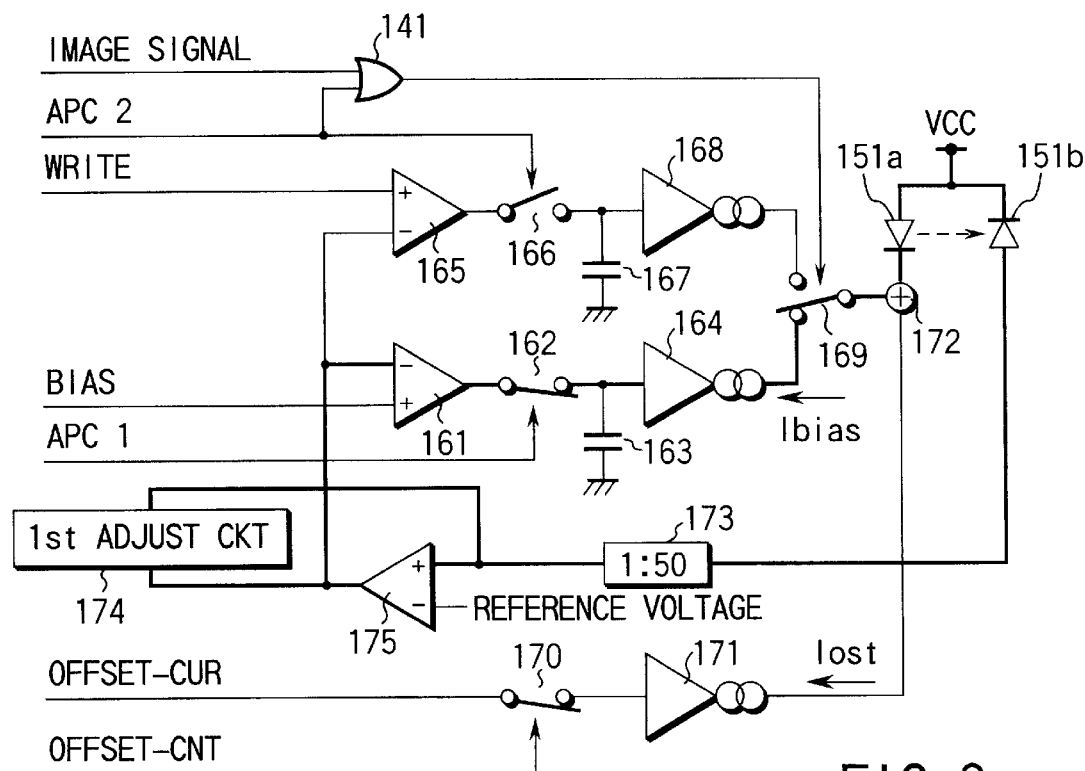
FIG. 8 is a diagram for use in explanation of the operation of the first embodiment.

FIG. 8 illustrates the operation of the first APC processing with its related portions indicated by bold lines. That is, a predetermined voltage corresponding to the laser emission intensity P1 at the time of the first APC processing is input to the comparator 161 as a bias emission intensity setting voltage BIAS. The switch 162 is closed (rendered conductive) during the first APC processing interval by a first APC signal APC1. Thus, the output of the comparator 161 is connected to the capacitor 163.

At the time of the first APC processing, a second APC signal APC2 and an image signal are not generated; thus, the switch 169 is placed to the terminal connected to the current amplifier 164, so that the laser diode 151a is connected with the current amplifier 164. The current amplifier 164 therefore sinks that current Ibias through the laser diode 151a which is proportional to the amount of charge stored on the capacitor 163.

At the time of the first APC processing, an offset current setting voltage signal OFFSET-CUR is generated and then applied to the current amplifier 171 through the switch 170 closed by an offset control signal OFFSET-CNT. Thus, the current amplifier 171 adds a constant current Iost to the drive current of the laser diode 151a.

In this state, a current corresponding to a light output of the laser diode 151a is output from the photodiode 151b. This output current is amplified by the current amplifier 173 having a current amplification factor of, say, 50 and then converted by the gain amplifier 175 having its gain adjusted by the first adjust circuit 174 into a voltage signal, which is in turn applied to the comparator 161. The first adjust circuit will be described later.

Here, when a desired emission intensity is not reached, that is, when the output voltage of the gain amplifier 175 is lower than the bias emission intensity setting voltage BIAS, the comparator 161 produces a high-level voltage (supply voltage Vcc), whereby the capacitor 163 is charged. As a result, the drive current of the laser diode 151a increases, leading to increased emission intensity.

Conversely, when the emission intensity is higher than a desired level, that is, when the output voltage of the gain amplifier 175 is higher than the bias emission intensity setting voltage BIAS, the comparator 161 produces a low-level voltage (ground voltage), thereby discharging the capacitor 163. As a result, the drive current of the laser diode 151a is decreased, lowering the emission intensity.

When the emission intensity is at the desired level, that is, when the output voltage of the gain amplifier 175 is equal to the bias emission intensity setting voltage BAIAS, the amount of charge on the capacitor 163 is held and as a result the emission intensity is also held.

Figure 9:
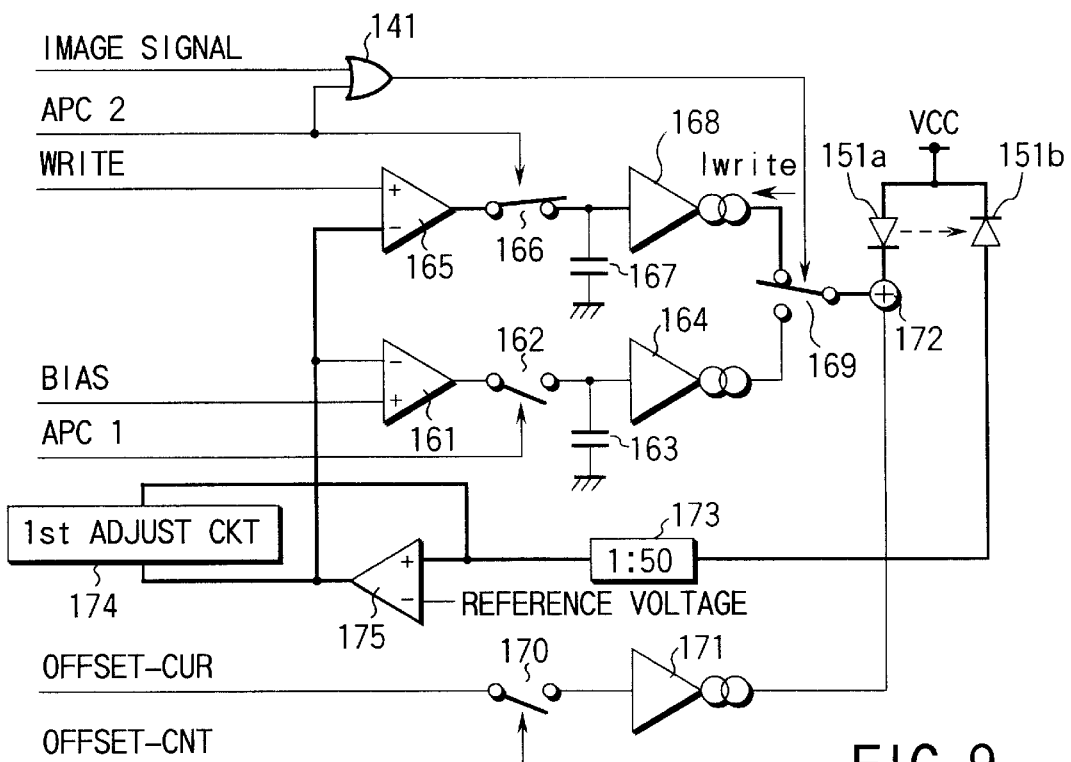
FIG. 9 is a diagram for use in explanation of the operation of the first embodiment.

FIG. 9 illustrates the operation of the second APC processing with its related portions indicated by bold lines. That is, a predetermined voltage corresponding to the laser emission intensity P2 at the time of the second APC processing is input to the comparator 165 as an emission intensity setting voltage WRITE. The switch 166 is closed (rendered conductive) during the second APC processing interval by the second APC signal APC2. Thus, the output of the comparator 165 is connected to the capacitor 167.

Through the OR circuit 141 the second APC signal APC2 places the switch 169 to the terminal connected to the current amplifier 168, so that the laser diode 151a is connected with the current amplifier 168. The current amplifier 168 therefore sinks that current from the laser diode 151a which is proportional to the amount of charge stored on the capacitor 167.

In this state, a current corresponding to a light output of the laser diode 151a is output from the photodiode 151b. This output current is amplified by the current amplifier 173 and then converted by the gain amplifier 175 into a voltage signal, which is in turn applied to the comparator 165.

Here, when a desired emission intensity is not reached, that is, when the output voltage of the gain amplifier 175 is lower than the write emission intensity setting voltage WRITE, the comparator 165 produces a high-level voltage, whereby the capacitor 167 is charged. As a result, the drive current of the laser diode 151a increases, leading to increased emission intensity.

Conversely, when the emission intensity is higher than the desired level, that is, when the output voltage of the gain amplifier 175 is higher than the write emission intensity setting voltage WRITE, the comparator 165 produces a low-level voltage, thereby discharging the capacitor 167. As a result, the drive current of the laser diode 151a decreases, lowering the emission intensity of the laser diode.

When the emission intensity is at the desired level, since the output voltage of the gain amplifier 175 is equal to the write emission intensity setting voltage WRITE, the amount of charge on the capacitor 167 is held and as a result the emission intensity of the laser diode is also held. The drive current of the laser diode 151a thus increases by Isw from Ibias to Iwrite.

Figure 10:
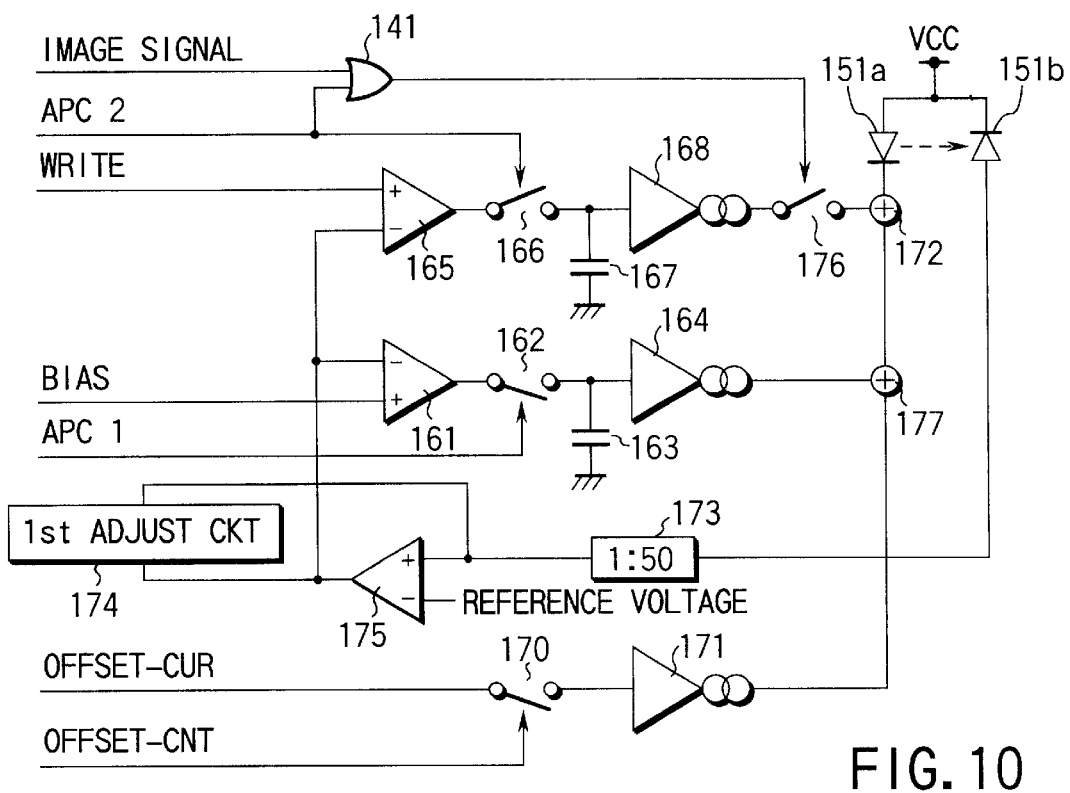
FIG. 10 is a schematic illustration of the laser control circuit according to a second embodiment of the present invention.

FIG. 10 shows the arrangement of the laser control circuit 150 according to a second embodiment of the present invention. This circuit remains basically unchanged from the circuit of FIG. 7 but differs in that the current amplifier 168 is connected to the current adder 172 by a switch 176 and a current adder 177 is provided which adds an output current of the current amplifier 164 to the drive current of the laser diode 151a.

In the second embodiment, the second APC processing for the modulation current Isw is performed after the control current Ibias below the threshold current has been set by the first APC processing. At the time no image is formed, the drive current of the laser diode 151a is set lower than and very close to the threshold current. At the time of image formation, the laser diode 151a is driven to emit light of desired intensity.

The operation of the circuit of FIG. 10 will be described in detail with reference to FIGS. 11 and 12.

Figure 11:
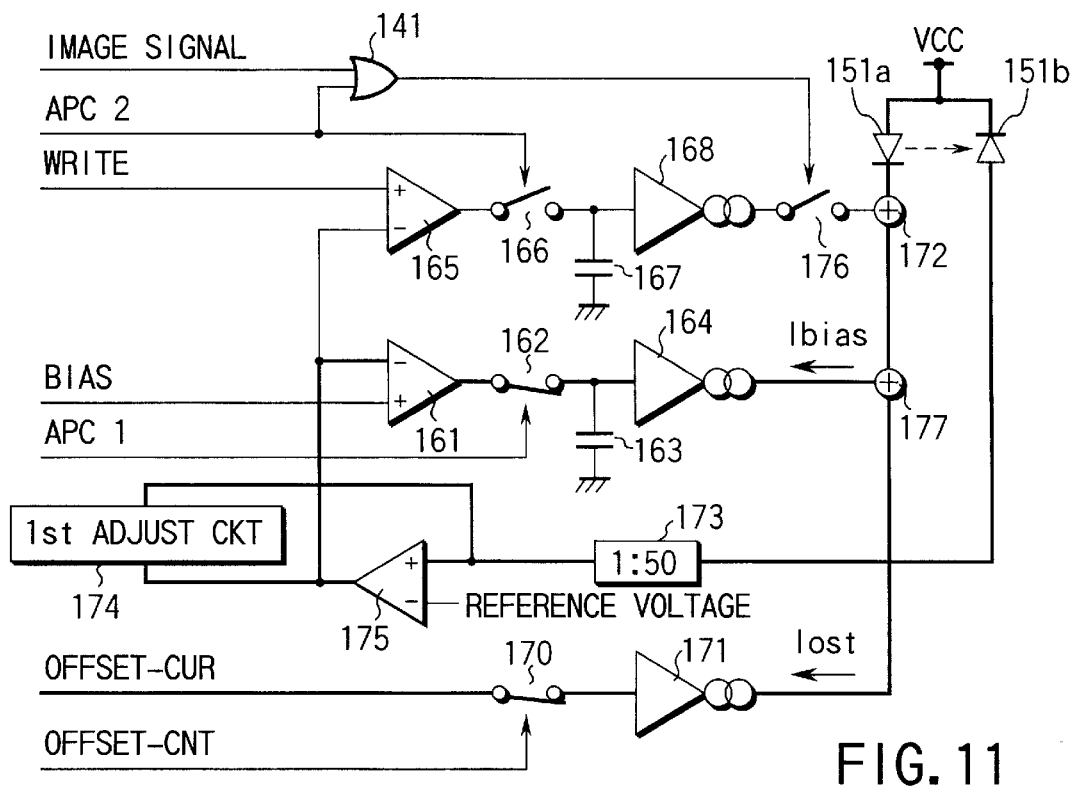
FIG. 11 is a diagram for use in explanation of the operation of the second embodiment.

FIG. 11 illustrates the operation of the first APC processing with its related portions indicated by bold lines. That is, a predetermined voltage corresponding to the laser emission intensity P1 at the time of the first APC processing is input to the comparator 161 as a bias emission intensity setting voltage BIAS. The switch 162 is closed (rendered conductive) during the first APC processing interval by the first APC signal APC1. Thus, the output of the comparator 161 is connected to the capacitor 163. The current amplifier 164 sinks a current from the laser diode 151a which is proportional to the amount of charge stored on the capacitor 163.

At the time of the first APC processing, the offset current setting voltage signal OFFSET-CUR is applied to the current amplifier 171 through the switch 170 closed by the offset control signal OFFSET-CNT. As a result, a constant current is added to the drive current of the laser diode 151a.

In this state, a current corresponding to a light output of the laser diode 151a is output from the photodiode 151b. This output current is amplified by the current amplifier 173 and then converted by the gain amplifier 175 into a voltage signal, which is in turn applied to the comparator 161.

Here, when a desired emission intensity is not reached, that is, when the output voltage of the gain amplifier 175 is lower than the bias emission intensity setting voltage BIAS, the comparator 161 produces a high-level voltage, whereby the capacitor 163 is charged. As a result, the drive current of the laser diode 151a increases, leading to increased emission intensity.

Conversely, when the emission intensity is higher than a desired level, that is, when the output voltage of the gain amplifier 175 is higher than the bias emission intensity setting voltage BIAS, the comparator 161 produces a low-level voltage, thereby discharging the capacitor 163. As a result, the drive current of the laser diode 151a is decreased, lowering the emission intensity.

When the emission intensity is at the desired level, that is, when the output voltage of the gain amplifier 175 is equal to the bias emission intensity setting voltage BAIAS, the amount of charge on the capacitor 163 is held and as a result the emission intensity is also held.

Figure 12:
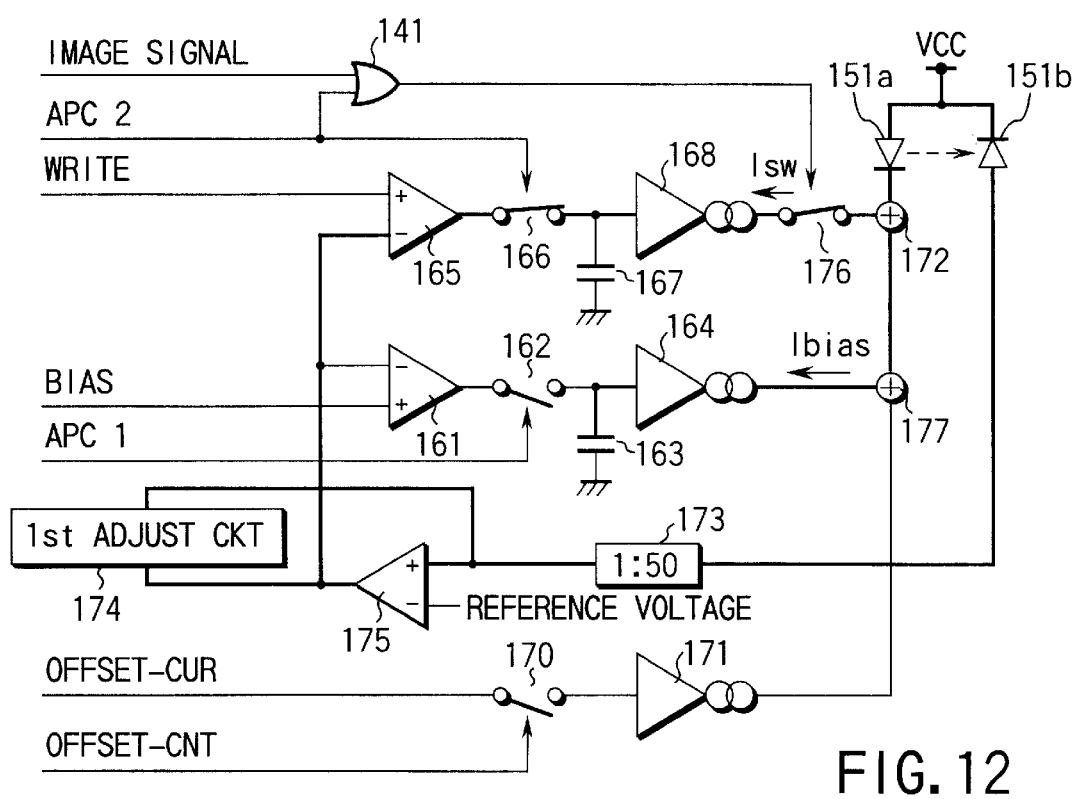
FIG. 12 is a diagram for use in explanation of the operation of the second embodiment.

FIG. 12 illustrates the operation of the second APC processing with its related portions indicated by bold lines. For the second APC processing, a current corresponding to the amount of charge stored on the capacitor 163 is output from the current amplifier 164, so that a drive current Ibias always flows through the laser diode 151a.

A predetermined voltage corresponding to the laser emission intensity P2 at the time of the second APC processing is input to the comparator 165 as the emission intensity setting voltage WRITE. The switch 166 is closed during the second APC processing interval by the second APC signal APC2. Thus, the output of the comparator 165 is connected to the capacitor 167.

The current amplifier 168 sinks that current from the laser diode 151a which is proportional to the amount of charge stored on the capacitor 167. Thus, the drive current of the laser diode corresponds to the sum of the current Ibias sunk by the current amplifier 164 and the current Isw sunk by the current amplifier 168.

In this state, a current corresponding to a light output of the laser diode 151a is output from the photodiode 151b. This output current is amplified by the current amplifier 173 and then converted by the gain amplifier 175 into a voltage signal, which is in turn applied to the comparator 165.

Here, when a desired emission intensity is not reached, that is, when the output voltage of the gain amplifier 175 is lower than the write emission intensity setting voltage WRITE, the comparator 165 produces a high-level voltage, whereby the capacitor 167 is charged. As a result, the drive current of the laser diode 151a increases, leading to increased emission intensity.

Conversely, when the emission intensity is higher than the desired level, that is, when the output voltage of the gain amplifier 175 is higher than the write emission intensity setting voltage WRITE, the comparator 165 produces a low-level voltage, thereby discharging the capacitor 167. As a result, the drive current of the laser diode 151a is decreased, lowering the emission intensity of the laser diode.

When the emission intensity is at the desired level, since the output voltage of the gain amplifier 175 is equal to the write emission intensity setting voltage WRITE, the amount of charge on the capacitor 167 is held and as a result the emission intensity of the laser diode is also held.

Figure 13:
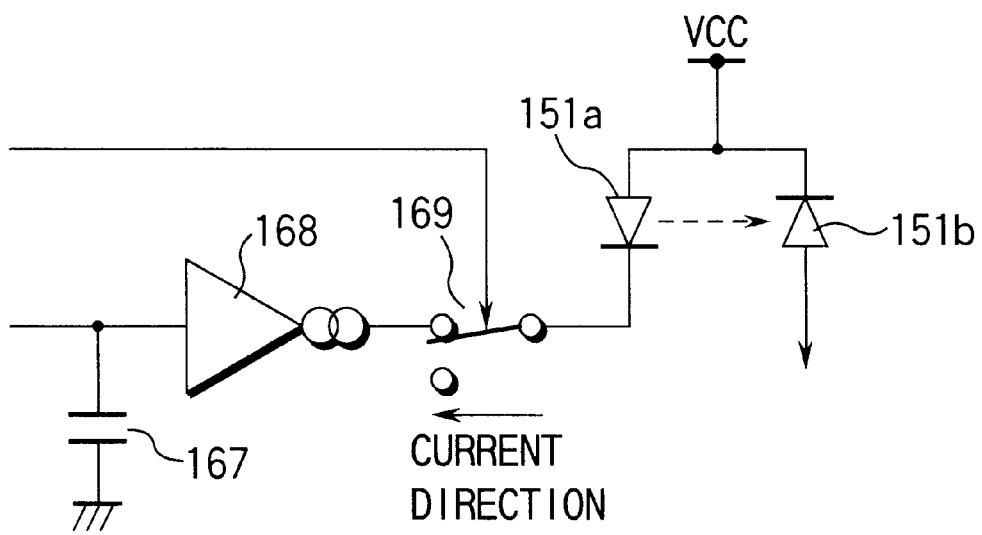
FIG. 13 shows the arrangement of the current amplifier for driving the laser diode.
Figure 14:
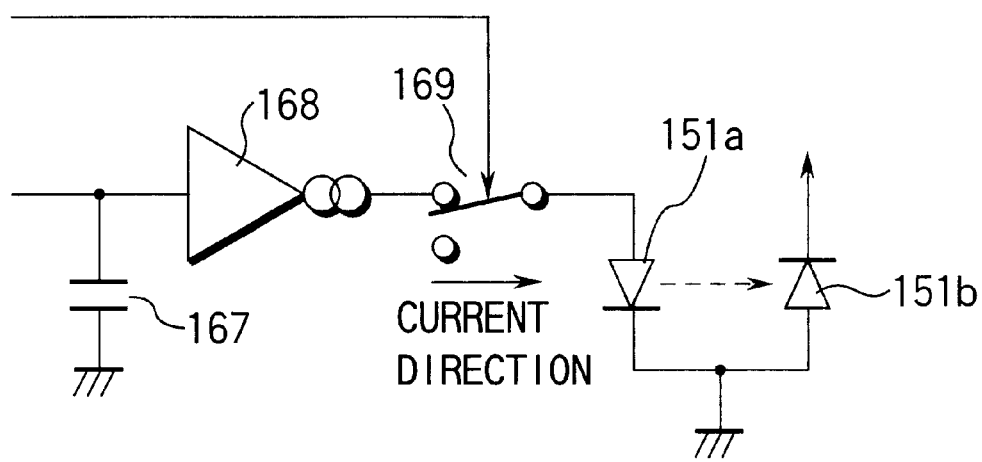
FIG. 14 shows the arrangement of another current amplifier for driving the laser diode.

In the circuit arrangements shown in FIGS. 7 and 10, the current amplifiers 164, 168 and 171 are of a current-sinking type. The type of current amplifier may be changed according to the type of semiconductor laser source used. FIGS. 13 and 14 show drive circuits for different types of laser diodes.

FIG. 13 shows a drive circuit that uses a current amplifier of a current-sinking type. In FIG. 13, only the current amplifier 168 is illustrated and the others are omitted for simplicity. In the semiconductor laser source 151, the anode of the laser diode 151a and the cathode of the photodiode 151b are connected together. The cathode of the laser diode 151a is connected to the output of the current amplifier 168.

FIG. 14 shows a drive circuit that uses a current-sourcing type of current amplifier. In FIG. 14 as well, only the current amplifier 168 is illustrated and the others are omitted for simplicity. In the semiconductor laser source 151, the cathode of the laser diode 151a and the anode of the photodiode 151b are connected together. The anode of the laser diode 151a is connected to the output of the current amplifier 168.

Next, the timing of the operation of the APC processing will be described specifically with reference to FIGS. 10 and 15.

As described in connection with FIG. 2, a laser beam emitted from the laser diode 151a is reflected by the polygon mirror 153, passes through the f-θ lens 154, is reflected by the first folding lens 155, and then is swept across the photosensitive drum 17. A fraction of the laser beam reflected by the second folding mirror 156 is directed onto the sync signal sensor 157. FIG. 15 shows the timing of the scanning of the laser beam across the photosensitive drum.

Here, the region on the photosensitive drum on which an image is actually formed is taken as the imaging region, and the other region is taken as the non-imaging region.

On the other hand, the non-imaging time indicates a time at which the laser diode 151a is forming a white portion of an output image. More specifically, the non-imaging time indicates a state where, for example, in FIG. 7, the current amplifier 164 drives the laser diode 151a with a current Ibias corresponding to the voltage across the capacitor 163 charged by the first APC processing. At the non-imaging time, therefore, the laser diode 151a is placed in the spontaneously emitting state.

The imaging time indicates a time at which the laser diode 151a is forming a black portion of an output image. More specifically, the imaging time indicates a state where the switch 166 is open, the switch 169 is placed to the side of the current amplifier 168, and the current amplifier 168 drives the laser diode 151a with a current Iwrite corresponding to the voltage across the capacitor 167 charged by the second APC processing. At the imaging time, therefore, the laser diode is emitting a beam of light of intensity P2.

In a case of digital copying apparatus of the electrophotographic type, only a laser beam modulated with image data is directed onto the photosensitive drum 17. The first and second processing cannot be performed without causing the laser diode 151a to emit light tentatively. Thus, the first and second processing are both performed in the non-imaging regions. The specific timing of the APC processing will be described below.

Figure 15:
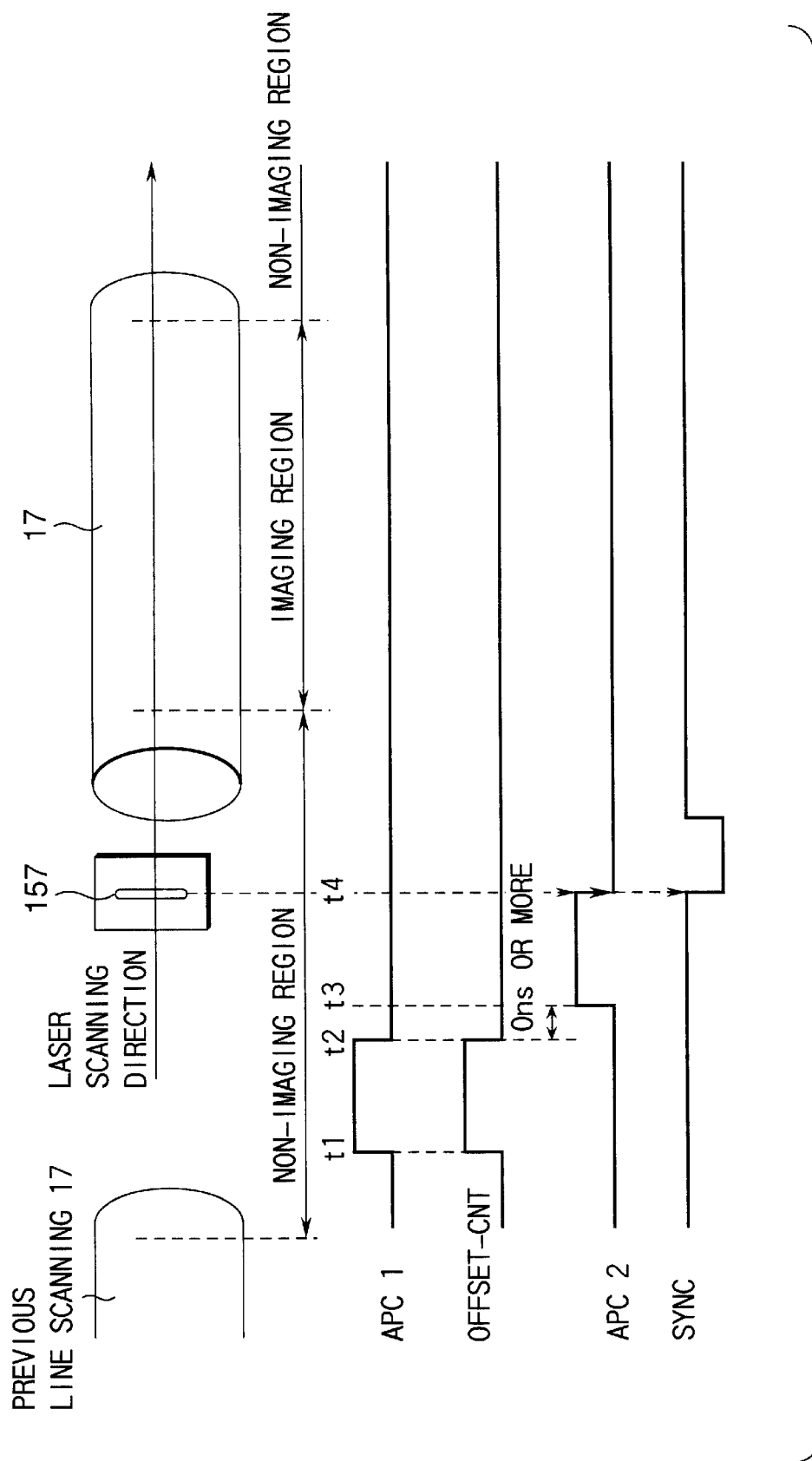
FIG. 15 is a diagram for use in explanation of the operation timing of the APC processing.

When the light output of the laser diode 151a terminates the scanning of the previous line and then begins scanning the non-imaging region, the first APC signal APC1 goes high at time t1 indicated in FIG. 15. At this point, since an image signal and a second APC signal APC2 are not produced, the switch 169 in FIG. 7 is connected to the current amplifier 164, so that the cathode of the laser diode 151a is connected to the output of the current amplifier 164.

As a result of the first APC signal APC1 going high, the switch 162 is closed, the capacitor 163 is charged or discharged, and the current amplifier 164 sinks a current corresponding to the voltage across the capacitor 163. On the other hand, the offset control signal OFFSET-CNT also goes high at the same time the first APC signal APC1 goes high. As a result, the current amplifier 171 sinks the constant current lost corresponding to the offset current setting voltage OFFSET-CUR. Thus, the laser diode 151a is driven with the sum of the output currents of the current amplifiers 164 and 171, whereby the first APC processing is performed.

If, in this state, the emission intensity of the laser diode 151a is below a desired level, then the capacitor 163 is charged, otherwise it is discharged. This feedback control permits the current amplifier 164 to sink the desired current Ibias. As a result, the laser diode 151a is driven with the sum of the current lost and the current Ibias to emit light of the desired intensity P1.

In the event that no charge is stored on the capacitor 163, as when the power is turned on or the circuit has been reset, the first APC signal APC1 and the offset control signal OFFSET-CNT shown in FIG. 15 are produced repeatedly. That is, by repeating scanning of some lines with a laser beam, a desired amount of charge can be stored on the capacitor 163.

When a copy operation is performed, one-time scanning provides a desired emission intensity because of compensations for droop due to the laser diode 151a being heated and variations in emission intensity due to the capacitor 163 being discharged or charged with leakage current. When the temperature of the laser diode is elevated with emission of light, the emission intensity decreases even if the drive current remains constant in magnitude. The droop indicates a decrease in emission intensity. The charging of the capacitor with leakage current indicates a phenomenon in which current leaks out from the input of the amplifier 164 to the capacitor 163.

At time t2, the first APC signal APC1 and the offset control signal OFFSET-CNT go low, terminating the first APC processing. At this point, the switches 162 and 170 in FIG. 8 are rendered open. The charge stored on the capacitor 163 at the APC processing time is held as it is and the current amplifier 164 continues sinking the current Ibias.

At time t3, the second APC signal goes high to close the switch 166 as shown in FIG. 9, whereby the second APC processing is initiated. At this point, the switch 169 is placed to the side of the current amplifier 169 by the second APC signal APC2, so that the cathode of the laser diode 151a is connected to the output of the current amplifier 168. If, in this state, the emission intensity of the laser diode 151a is lower than the desired intensity P2, then the capacitor 167 will be charged. This charging is continued until the current that the current amplifier 168 sinks reaches Iwrite shown in FIG. 6. That is, the drive current of the laser diode 151a increases by Isw from Ibias to Iwrite. If, on the other hand, the emission intensity of the laser diode is higher than P2, then the capacitor 167 will be discharged.

In the event that no charge is stored on the capacitor 167, as when the power is turned on or the circuit has been reset, the second APC signal APC2 shown in FIG. 15 is produced repeatedly. That is, by repeating scanning of some lines with a laser beam, a desired amount of charge can be stored on the capacitor 167. When a copy operation is performed, an operation provides a desired emission intensity because of compensations for droop due to the laser diode 151a being heated and variations in emission intensity due to the capacitor 167 being discharged or charged with leakage current.

At time t4, a sync signal SYN is produced by directing a laser beam from the laser diode 151a at the second APC processing time onto the sync signal sensor 157. The sync signal sensor comprises a photo-detecting device, such as a photodiode, that converts light into an electrical signal. The second APC signal is reset by the falling of the sync signal SYN, terminating the second APC processing.

After the termination of the second APC processing, the switches 162, 166 and 170 are off and the changeover switch 169 is placed to the side of the current amplifier 164. As a result, the laser diode 151a is driven with the current Ibias corresponding to the amount of charge stored on the capacitor 163.

In the imaging region, when an image signal at a 1 level (corresponding to black portions in an image) is input, that is, at the time of image formation, the change-over switch 169 is placed to the side of the current amplifier 168, so that the drive current of the laser diode 151a increases by Isw from Ibias to Iwrite. As a result, the laser diode 151a is enabled to emit light of the intensity P2 most suitable for writing.

When an image signal at a O level (corresponding to white portions in an image) is input, the switch 169 is placed to the side of the current amplifier 164, so that the laser diode 151a is driven with the current Ibias corresponding to the voltage across the capacitor 163.

Upon reentry to the imaging region as a result of the progress of scanning, the first APC processing is performed. After the termination of the first APC processing, the second APC processing is initiated. When a sync signal is produced, the second APC processing is terminated. Such operations are repeated.

If the sync signal sensor 157 and the photosensitive drum 17 are spaced sufficiently apart from each other, it would also be possible to produce a sync signal by directing a laser beam at the time of the first APC processing onto the sync signal sensor and perform the second APC processing by the time the laser beam arrives at the photosensitive drum 17.

Figure 16:
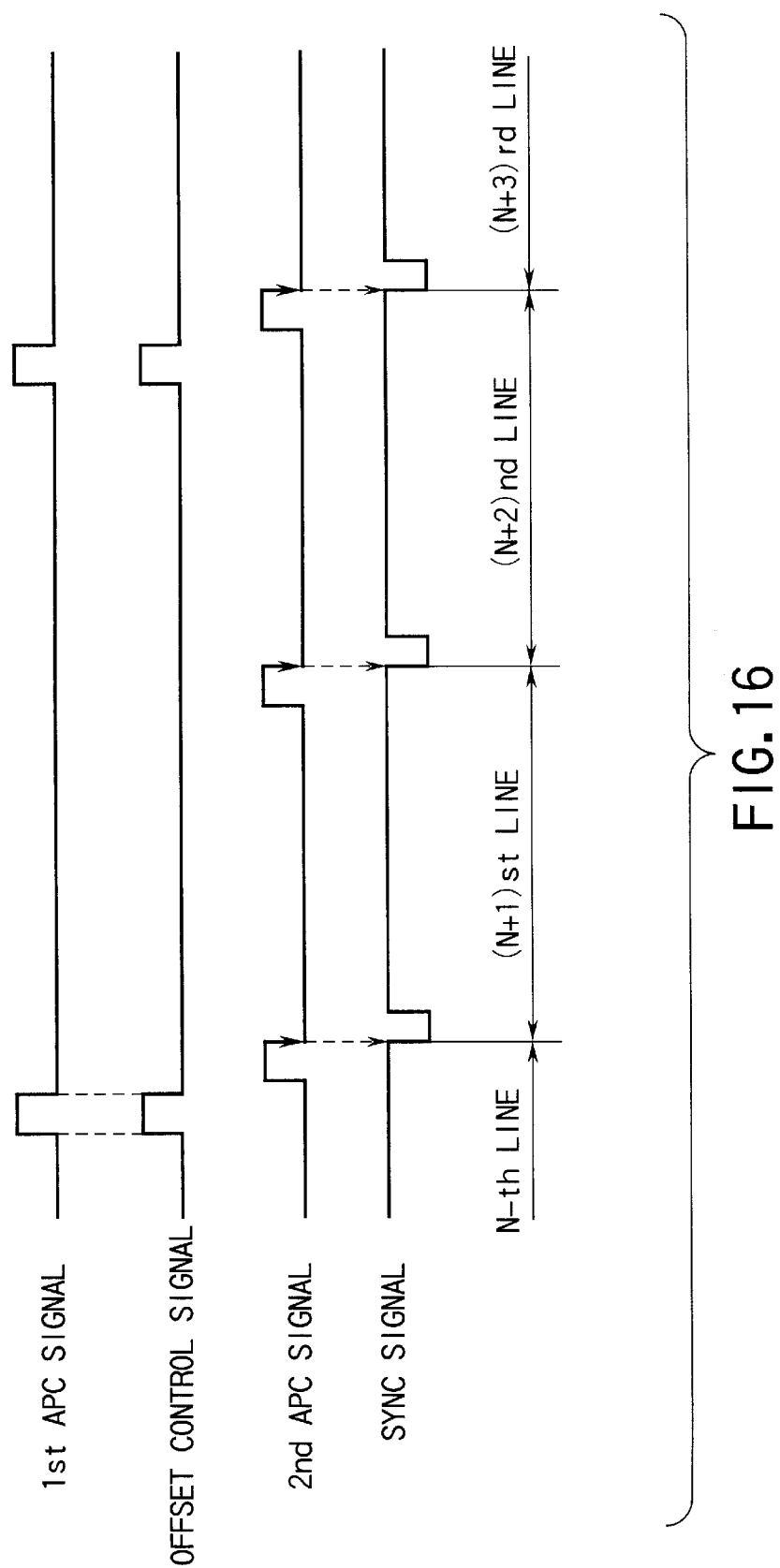
FIG. 16 is a diagram for use in explanation of the other operation timing of the APC processing.

Next, APC processing the timing of which differs from that in FIG. 15 will be described with reference to FIG. 16. In this example, the first APC processing is not performed with each scan.

Even if the emission intensity of the laser diode 151a varies due to the diode being heated and the capacitor 167 being charged or discharged with leakage current, if the variations are tolerable over several lines of scanning, the need of performing the first APC processing for each scan line is eliminated by optimizing the capacitance of the capacitor 163. As shown in FIG. 16, therefore, it becomes possible to perform the first APC processing on alternate scan lines by way of example. Further, changing the capacitance will permit the first APC processing to be performed at an interval of two lines or more. However, in order to produce a sync signal by the sync signal sensor 157, it is required to perform the second APC processing with each line.

In addition, if, as indicated previously, the sync signal sensor 157 and the photosensitive drum 17 are spaced sufficiently apart from each other and a sync signal is produced at the time of the first APC processing, it would also be possible to perform the first APC processing with each line and perform the second APC processing on alternate lines or at an interval of two lines or more.

A third embodiment of the present invention will be described next.

The efficiency in detecting the emission intensity of the laser diode 151a varies from device (photodiode) to device. Since the first and second APC processing are based on monitoring output currents of the photodiode 151b, the emission intensity set by the APC processing will vary in the presence of variations in the light detecting efficiency among photodiodes.

Figure 17A:
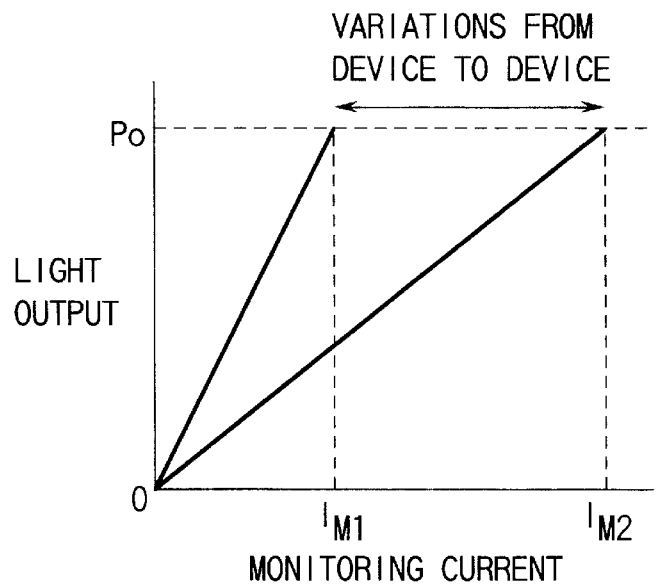
FIGS. 17A and 17B are diagrams for use in explanation of semiconductor laser variations from device to device.

Here, an example will be described using FIGS. 7 and 17. At the execution of the first APC processing, if a monitoring current of IM2 is output for light output Po as shown in FIG. 17A, and the resulting voltage at the inverting input of the comparator 161 is V1 and balanced with the bias emission intensity setting voltage BIAS at the noninverting input, then the capacitor 163 is in the stable state. As a result, the emission intensity also stabilizes.

However, when a photodiode which is poor in efficiency is used, for example, when a device is used which provides a monitoring current of IM1 for the emission intensity Po, the voltage at the inverting input of the comparator 161 will become lower than V1 at the time of the first APC processing. As a result, the capacitor 163 is charged, resulting in the voltage at the inverting input going to V1. The emission intensity at this point increases to a value far from Po.

Figure 17B:
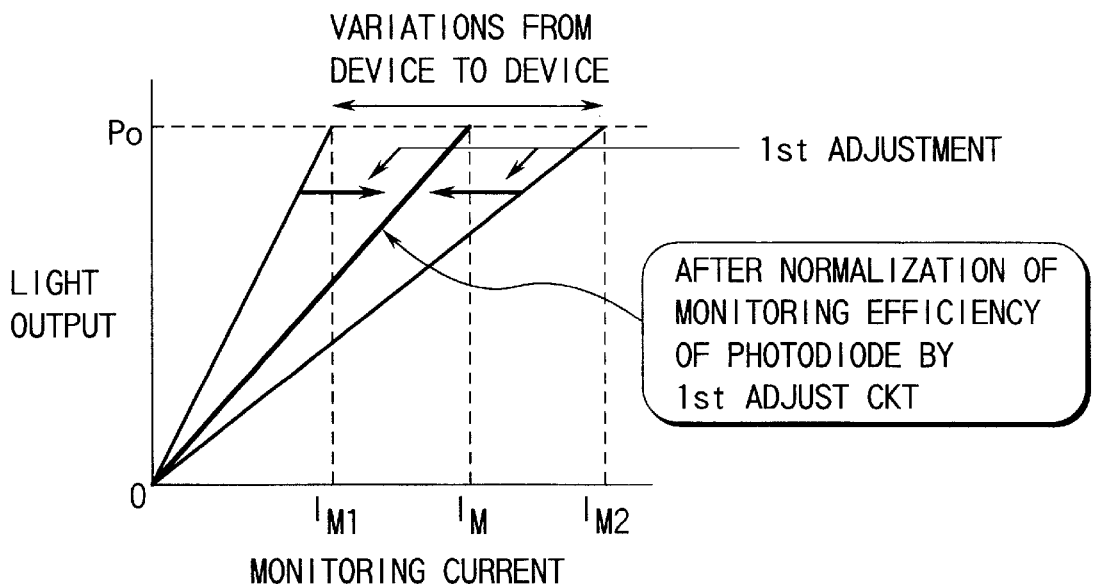

To eliminate such variations, it is required to make an adjustment by means of the first adjust circuit so that, as shown in FIG. 17B, when the emission intensity is, say, 1 mW, the voltage at the inverting input of the comparator 161 resulting from monitoring current will become, say, 1 V. Such an adjustment is made not only in the laser control circuit of FIG. 7 but in the circuit of FIG. 13.

Figure 2:
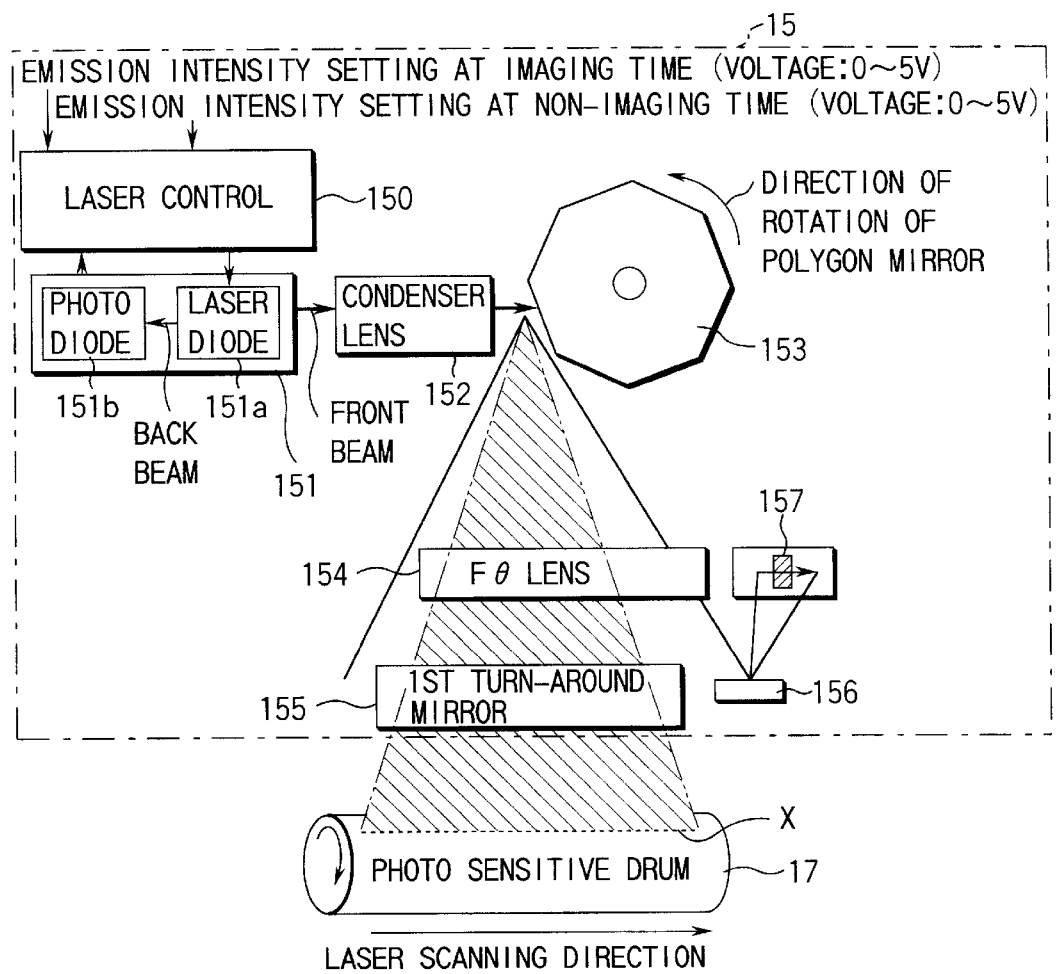
FIG. 2 is a schematic representation of the laser optical system unit shown in FIG. 1.
Figure 18A:
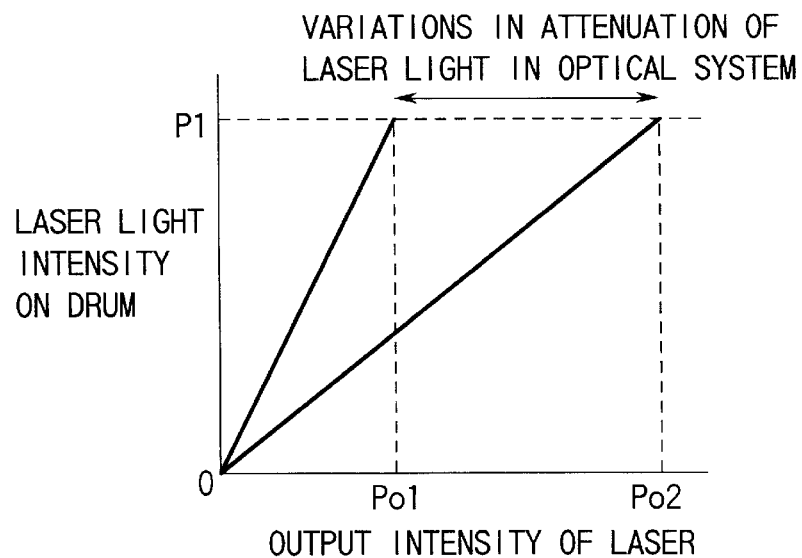
FIGS. 18A and 18B are diagrams for use in explanation of variations in light attenuation from optical system to optical system.

In the case of digital copying apparatus, as can be seen from FIG. 2, the light transmission efficiency of the optical system varies due to the lens-mirror combination. As shown in FIG. 18A, even in the case where the light intensity on the drum 17 is P1, the emission intensity of the laser diode itself could be P01 or P02 due to variations in optical efficiency.

Figure 18B:
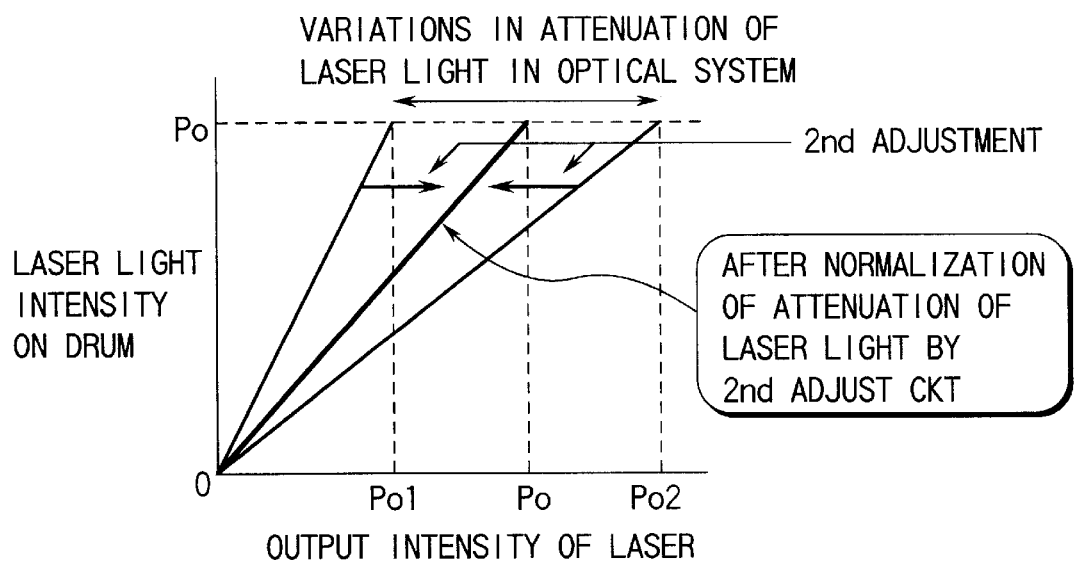

That is, even if the desired emission intensity of the laser diode itself is obtained owing to the first adjust circuit, the light output intensity on the photosensitive drum 17 will vary due to the laser optical system unit 15. In this embodiment, therefore, the attenuation of light that travels from the laser diode 151a to the photosensitive drum 17 is normalized by a second adjust circuit as shown in FIG. 18B.

Figure 19:
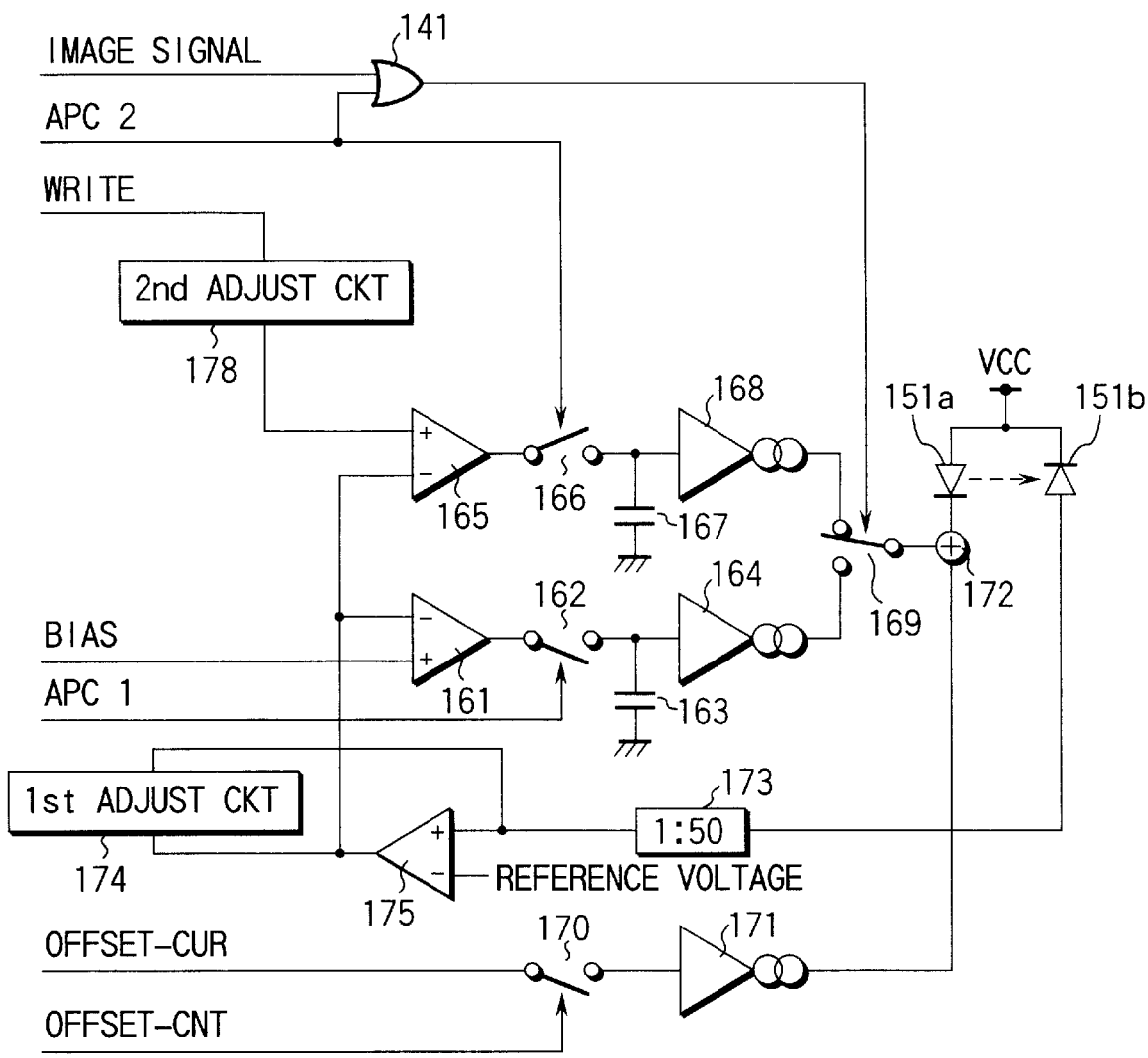
FIG. 19 shows the arrangement of the laser control circuit when a fourth embodiment is applied to the circuit of FIG. 7.
Figure 20:
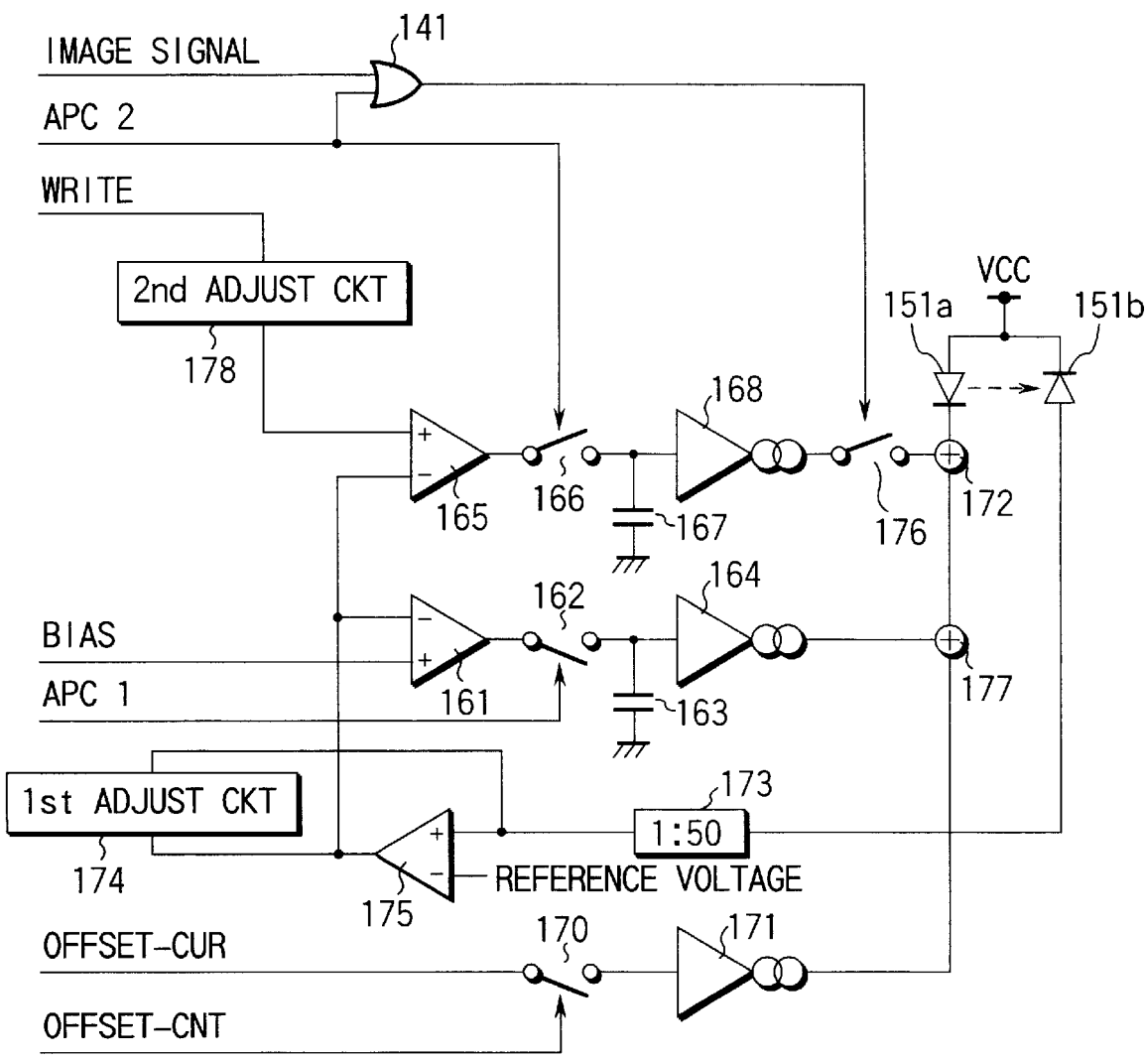
FIG. 20 shows the arrangement of the laser control circuit when the fourth embodiment is applied to the circuit of FIG. 10.

In the circuit of FIG. 19, the second adjust circuit 178 is provided to precede the noninverting input of the comparator 165 in FIG. 7. The detecting efficiency of the photodiode 151b is normalized by the first adjust circuit and variations in optical efficiency of the laser optical system unit 15 can be compensated for by the second adjust circuit 178 independently of the first adjust circuit. FIG. 20 shows a variation of the circuit of FIG. 13 such that the second adjust circuit 178 is connected to precede the noninverting input of the comparator 165.

Here, specific examples of the first and second adjust circuits 174 and 178 will be described.

Figure 21:
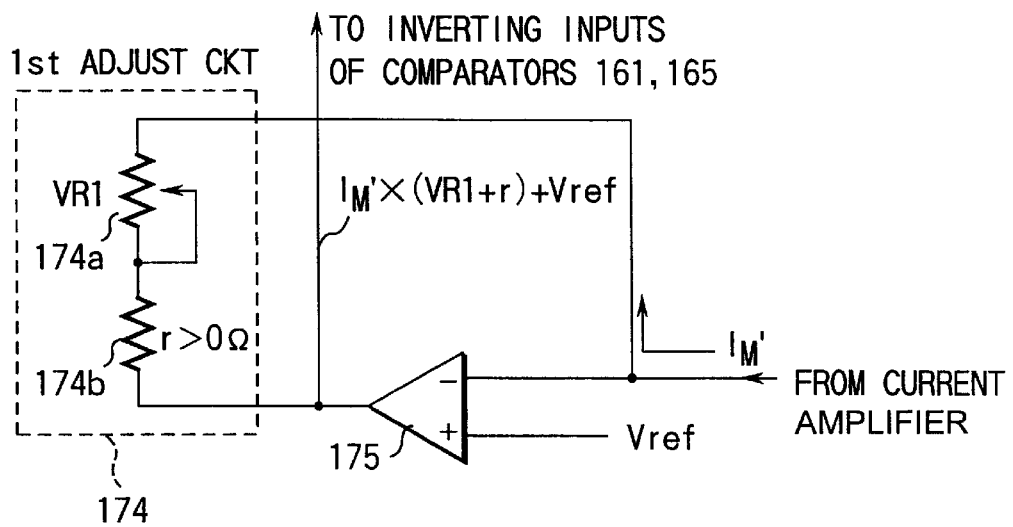
FIG. 21 is a circuit diagram illustrating the first adjustment circuit shown in FIGS. 19 and 20.
Figure 22:
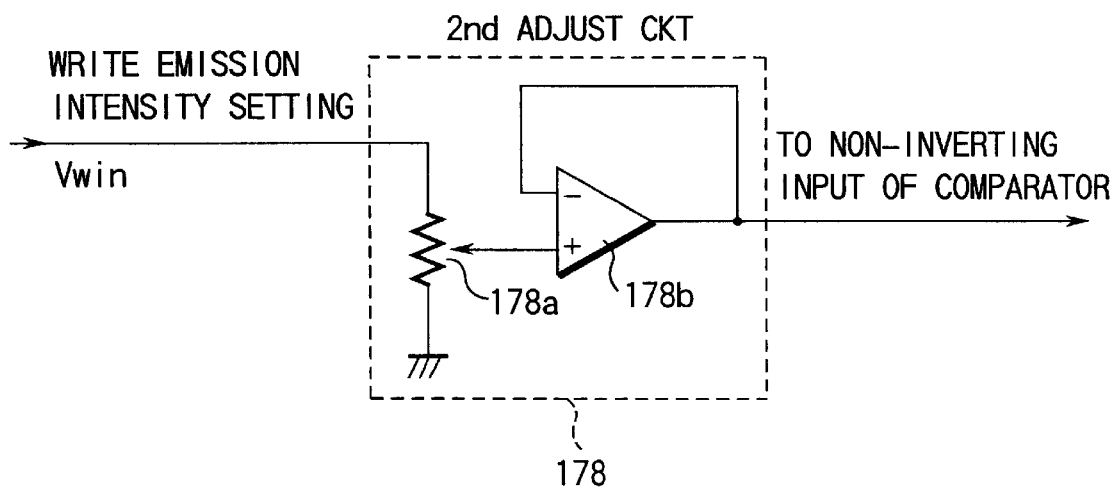
FIG. 22 is a circuit diagram illustrating the second adjustment circuit shown in FIGS. 19 and 20.

FIG. 21 shows an example of the first adjust circuit 174. A monitoring current output from the photodiode 151b in response to light output from the laser diode 151a is amplified by the current amplifier 173 and then applied as current IM' to the inverting input of the gain amplifier 175 having its noninverting supplied with a reference voltage Vref. The first adjust circuit 174, which is composed of a variable resistor 174a (VR1 in value) and a fixed resistor 174b (r in value), permits the following voltage to appear at the output of the gain amplifier 175:

$$IM' \times (VR1+r) + Vref$$

It should be noted however that, as is evident from the circuit arrangement, setting the value, r, of the fixed resistor 174b and the value, VR1, of the variable resistor 174a to zero results in $$IM' \times 0 + Vref$$

This leads to failure to make adjustments. For this reason, the resistance, r, of the fixed resistor 174b should not be set to zero.

The voltage appearing at the output of the gain amplifier 175 is applied to the inverting inputs of the respective comparators 161 and 165 for comparison with a respective one of the externally applied voltages: the bias emission intensity setting voltage for the first APC processing, and the write emission intensity setting voltage for the second APC processing.

FIG. 27 shows an example of the second adjust circuit 178. The write emission intensity setting voltage is produced by an external D/A converter not shown. Assuming that voltage to be Vwin, the second adjust circuit 178, which is composed of a variable resistor 178a and a voltage follower 178b, provides a voltage such that Vwin×α(α=0 to 1) to the noninverting input of the comparator 165.

The voltage follower 178b is intended to minimize the output signal impedance, but it may be removed if the impedance of the comparator 165 as seen from its noninverting input is extremely high in comparison with the resistance VR2 of the variable resistor 178a.

According to the embodiment, as described above, the drive current of the semiconductor laser source can be optimized at both the non-imaging time and the imaging time; thus, a stable light output intensity can be ensured at all times regardless of variations in ambient temperature. As a result, images that are uniform in density can be formed.

Moreover, even if the operating temperature (ambient temperature) varies, there is no variation in the amplitude of the modulation current of the semiconductor laser source; thus, the amount of radiation noise will not vary with temperature.

Furthermore, even if the operating temperature (ambient temperature) varies, the response time required for the semiconductor laser source to rise/fall remains unchanged; thus, light output waveforms with good rise and decay times can be obtained at all times.

In addition, variations from photodiode to photodiode in the efficiency in monitoring laser outputs and variations from optical system to optical system in the optical characteristics can be compensated for.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image formation apparatus for forming an image on an image carrier by scanning an imaging region on the image carrier and a non-imaging region with a laser beam emitted from a semiconductor laser source, comprising:

a detector for detecting the emission level of the laser source;

a first emission level control unit which controls a drive current supplied to the laser source on the basis of the result of detection by the detector so that the laser source emits light at a predetermined spontaneous emission level at the time no image is formed by the laser source; and a second emission level control unit which controls the drive current applied to the laser source on the basis of detection by the detector so that the laser source emits light at a first laser emission level at the time an image is formed by the laser source.

2. The apparatus according to claim 1, wherein the first and second emission level control units are adapted to control the drive current when the laser beam is scanning the non-imaging region.

3. The apparatus according to claim 2, wherein the first emission level control unit includes a first drive unit which, during a first time interval, drives the laser source with a current which corresponds to the sum of a first drive current corresponding to the spontaneous emission level and a second drive current having a fixed value to thereby allow the laser source to emit light at a second laser emission level, and the second emission level control unit includes a second drive unit which, during a second time interval, drives the laser source with a third drive current corresponding to the first laser emission level to thereby allow the laser source to emit light at the first laser emission level.

4. The apparatus according to claim 2, wherein the detector includes a photodiode for producing a current corresponding to the emission level of the laser source, the first emission level control unit includes a first current amplifier responsive to a first control signal produced during the first time interval for driving the laser source with the second drive current, a current-to-voltage converter for converting a current from the photodiode into a voltage, a first comparator for making a comparison between a first voltage corresponding to the predetermined spontaneous emission level and the voltage from the current-to-voltage converter, a first switch controlled by the first control signal, a first capacitor which is connected to the comparator through the first switch, and a second current amplifier for outputting a current corresponding to a voltage across the first capacitor, and the second emission level control unit includes a second comparator for making a comparison between a second voltage corresponding to the first laser emission level and the voltage from the current-to-voltage converter, a second switch controlled by a second control signal produced during the second time interval, a second capacitor which is connected to the second comparator through the second switch, and a third current amplifier for outputting a current corresponding to a voltage across the second capacitor, and wherein the apparatus further comprises an OR circuit for ORing the second control signal and an image signal, and a third switch responsive to an output of the OR circuit for connecting the laser source to either of the first and second current amplifiers.

5. The apparatus according to claim 2, wherein the first emission level control unit includes a first drive unit which, during a first time interval, drives the laser source with a current which corresponds to the sum of a first drive current corresponding to the spontaneous emission level and a second drive current having a fixed value to thereby allow the laser source to emit light at a second laser emission level, and the second emission level control unit includes second drive unit which, during a second time interval, drives the laser source with a current which corresponds to the sum of the first drive current and a third drive current to thereby allow the laser source to emit light at the first laser emission level.

6. The apparatus according to claim 2, wherein the detector includes a photodiode for producing a current corresponding to the emission level of the laser source, the first emission level control unit includes a first current amplifier responsive to a first control signal produced during the first time interval for driving the laser source with a second drive current, a current-to-voltage converter for converting a current from the photodiode into a voltage, a first comparator for making a comparison between a first voltage corresponding to the predetermined spontaneous emission level and the voltage from the current-to-voltage converter, a first switch controlled by the first control signal, a first capacitor which is connected to the comparator through the first switch, and a second current amplifier for driving the laser source with a current corresponding to a voltage across the first capacitor, and the second emission level control unit includes a second comparator for making a comparison between a second voltage corresponding to the first laser emission level and the voltage from the current-to-voltage converter, a second switch controlled by a second control signal produced during the second time interval, a second capacitor which is connected to the second comparator through the second switch, and a third current amplifier for driving the laser source with a current corresponding to a voltage across the second capacitor, and wherein the apparatus further comprises an OR circuit for ORing the second control signal and an image signal, and a third switch responsive to an output of the OR circuit for connecting the second current amplifier to the laser source.

7. The apparatus according to claim 1, wherein the control by the second emission level control unit is performed after the control by the first emission level control unit.

8. An image formation apparatus for forming an image on an image carrier by scanning a laser beam emitted from a semiconductor laser source across the image carrier through an optical system, comprising:

a detector for detecting the emission level of the laser source;

a first adjust unit which adjusts variations in the detecting efficiency of the detector;

a first emission level control unit which controls a drive current supplied to the laser source on the basis of the result of detection by the detector so that the laser source emits light at a predetermined spontaneous emission level at the time no image is formed by the laser source;

a second emission level control unit which controls the drive current applied to the laser source on the basis of detection by the detector so that the laser source emits light at a first laser emission level at the time an image is formed by the laser source; and a second adjust unit which compensates for variations in attenuation characteristics of the optical system.

9. A method of controlling an emission level of a laser source, said method being used with an image formation apparatus for forming an image on an image carrier by scanning an imaging region on the image carrier and a non-imaging region, with a laser beam emitted from the laser source, said method comprising:

a first step of detecting the emission level of the laser source;

a second step of controlling a drive current supplied to the laser source on the basis of the result of detection by the first step so that the laser source emits light at a predetermined spontaneous emission level at the time no image is to be formed by the laser source; and a third step of controlling the drive current applied to the laser source on the basis of the result of the detection by the first step so that the laser source emits light at a first laser emission level at the time an image is to be formed by the laser source.

10. The method according to claim 9, where the second step is performed when the laser beam is scanning the non-imaging region.

11. The method according to claim 10, further comprising the step of producing a sync signal synchronized with one scan using the laser beam output at the time of emission level control by the third step, and wherein the emission level control by the second step is performed once in multiple scans of the laser beam and the emission level control by the third step is performed once with each scan of the laser beam.

12. The method according to claim 10, further comprising the step of producing a sync signal synchronized with one scan using the laser beam output at the time of emission level control by the second step, and wherein the emission level control by the second step is performed once with each scan of the laser beam and the emission level control by the third step is performed once in multiple scans of the laser beam.

* * * * *